United States Patent
Ryu et al.

(10) Patent No.: US 11,456,823 B2
(45) Date of Patent: Sep. 27, 2022

(54) DISTANCE AND ANGLE BASED SIDELINK HARQ

(71) Applicant: QUALCOMM Incorporated, San Diego, CA (US)

(72) Inventors: Jung Ho Ryu, Fort Lee, NJ (US); Tao Luo, San Diego, CA (US); Junyi Li, Chester, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/896,879

(22) Filed: Jun. 9, 2020

(65) Prior Publication Data

US 2020/0412490 A1 Dec. 31, 2020

Related U.S. Application Data

(60) Provisional application No. 62/868,692, filed on Jun. 28, 2019.

(51) Int. Cl.
*H04L 1/18* (2006.01)
*H04W 72/04* (2009.01)
(Continued)

(52) U.S. Cl.
CPC .......... *H04L 1/1819* (2013.01); *H04W 16/28* (2013.01); *H04W 72/0406* (2013.01);
(Continued)

(58) Field of Classification Search
None
See application file for complete search history.

(56) References Cited

U.S. PATENT DOCUMENTS

| 2015/0092875 A1* | 4/2015 | Kim | H04B 7/0617 |
| | | | 375/267 |
| 2017/0331577 A1* | 11/2017 | Parkvall | H04W 4/00 |

(Continued)

OTHER PUBLICATIONS

Huawei., et al., "Sidelink Physical Layer Procedures for NR V2X," 3GPP Draft, 3GPP TSG RAN WG1 Meeting #97, R1-1906008, 3rd Generation Partnership Project (3GPP), Mobile Competence Centre, 650, Route Des Lucioles, F-06921, Sophia-Antipolis Cedex, France, vol. RAN WG1. No, Reno, USA; May 13, 2019-May 17, 2019, May 3, 2019 (May 3, 2019), XP051708050, 23 pages, Retrieved from the Internet: URL: http://www.3gpp.org/ftp/tsg%5Fran/WG1%5FRL1/TSGR1%5F97/Docs/R1%2D1906008%2Ezip , [retrieved on May 3, 2019], pp. 6-8, 2.4.1.1 HARQ feedback, pp. 6-8, 2.4.1.1.

(Continued)

*Primary Examiner* — Steve R Young
(74) *Attorney, Agent, or Firm* — Harrity & Harrity, LLP; Kevin M. Donnelly

(57) ABSTRACT

Various aspects of the present disclosure generally relate to wireless communication. In some aspects, a receiver may receive, from a transmitter, a sidelink communication and sidelink control information (SCI), associated with the sidelink communication, that indicates one or more distance parameter and angle parameter combinations for hybrid automatic repeat request (HARQ) feedback. The receiver may determine that the receiver satisfies a distance parameter and angle parameter combination of the one or more distance parameter and angle parameter combinations. The receiver may transmit, based at least in part on determining that the receiver satisfies the distance parameter and angle parameter combination, HARQ feedback for the sidelink communication to the transmitter on a sidelink. Numerous other aspects are provided.

30 Claims, 10 Drawing Sheets

(51) Int. Cl.
*H04W 16/28* (2009.01)
*H04W 88/14* (2009.01)
*H04W 92/18* (2009.01)

(52) U.S. Cl.
CPC ... *H04W 72/0446* (2013.01); *H04W 72/0453* (2013.01); *H04W 88/14* (2013.01); *H04W 92/18* (2013.01)

(56) References Cited

U.S. PATENT DOCUMENTS

| | | | |
|---|---|---|---|
| 2018/0279324 A1* | 9/2018 | Wang | H04L 1/1854 |
| 2020/0127710 A1* | 4/2020 | Athley | H04B 7/0452 |
| 2020/0275244 A1* | 8/2020 | Lee | G01S 13/876 |
| 2020/0280398 A1* | 9/2020 | Hwang | H04W 4/40 |
| 2020/0313804 A1* | 10/2020 | Ryu | H04L 1/1861 |
| 2021/0058899 A1* | 2/2021 | Lee | H04W 52/383 |
| 2021/0105789 A1* | 4/2021 | Freda | H04W 4/40 |
| 2021/0203455 A1* | 7/2021 | Zhang | H04L 1/1854 |
| 2021/0297128 A1* | 9/2021 | Badic | H04W 72/0406 |

OTHER PUBLICATIONS

International Search Report and Written Opinion—PCT/US2020/037021—ISA/EPO—dated Sep. 29, 2020.
LG Electronics: "Feature Lead Summary for Agenda Item 7.2.4.5 Physical Layer Procedures tor Sidelink," 3GPP Draft, 3GPP TSG RAN WG1 #97, R1-1907682, Feature Lead Summary of Phy Procedure in NR Sidelink, 3rd Generation Partnership Project (3GPP), Mobile Competence Centre, 650, Route Des Lucioles, F-06921, Sophia-Antipolis Cedex, France, vol. RAN WG1. No. Reno. USA, May 13, 2019-May 17, 2019, May 16, 2019 (May 16, 2019), XP051739971, 26 pages, Retrieved from the Internet: URL: http://www.3gpp.org/ftp/tsg%5Fran/WG1%5FRL1/TSGR1%5F97/Docs/R1%2D1907682%2Ezip [retrieved on May 16, 2019] section 3.
Qualcomm Incorporated: "Physical Layer Procedures for Sidelink", 3GPP Draft, 3GPP TSG RAN WG1 Meeting #97, R1-1907274, Physical layer procedures for sidelink, 3rd Generation Partnership Project (3GPP), Mobile Competence Centre, 650, Route Des Lucioles, F-06921, Sophia-Antipolis Cedex, France, vol. RAN WG1. No. Reno. USA, May 13, 2019-May 17, 2019, May 13, 2019 (May 13, 2019), XP051728714, 16 pages, Retrieved from the Internet: URL: http://www.3gpp.org/ftp/Meetings%5F3GPP%5FSYNC/RAN1/Docs/R1%2D1907274%2Ezip, [retrieved on May 13 2019] section 2.1.1 proposals 1-4.
VIVO: "Physical Layer Procedure for NR sidelink," 3GPP Draft, 3GPP TSG RAN WG1 Meeting #97, R1-1906142, Physical Layer Procedure for NR sidelink, 3rd Generation Partnership Project (3GPP), Mobile Competence Centre, 650, Route Des Lucioles, F-06921, Sophia-Antipolis Cedex, France, vol. RAN WG1. No. Reno. USA, May 13, 2019-May 17, 2019, May 13, 2019 (May 13, 2019). XP051727598, pp. 1-12, Retrieved from the Internet: URL: http://www.3gpp.org/ftp/Meetings%5F3GPP%5FSYNC/RAN1/Docs/R1%2D1906142%2Ezip [retrieved on May 13, 2019] section 3.4.

* cited by examiner

DISTANCE AND ANGLE BASED SIDELINK HARQ

CROSS-REFERENCE TO RELATED APPLICATION

This application claims priority to U.S. Provisional Patent Application No. 62/868,692, filed on Jun. 28, 2019, entitled "DISTANCE AND ANGLE BASED SIDELINK HARQ," which is hereby expressly incorporated by reference herein.

FIELD OF THE DISCLOSURE

Aspects of the present disclosure generally relate to wireless communication, and more particularly to techniques and apparatuses for distance and angle based sidelink hybrid automatic repeat request (HARQ).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In a wireless network, two or more subordinate entities, such as two or more UEs or two or more integrated access and backhaul (IAB) nodes, may communicate with each other using sidelink communications. In some cases, a receiver may provide feedback associated with a sidelink communication that a transmitter transmitted to the receiver on a sidelink (for example, from transmitter UE to receiver UE or from transmitter IAB node to receiver IAB node). The feedback may include, for example, hybrid automatic repeat request (HARQ) feedback (such as an acknowledgement (ACK) or a negative acknowledgement (NACK) for the sidelink communication). The receiver may transmit the HARQ feedback in one or more HARQ feedback communications on the sidelink. In some aspects, the transmitter may be capable of using beamforming and a plurality of antenna panels (which, in some cases, may be referred to as multi-panel) to receive HARQ feedback on a sidelink. In this way, the transmitter may use beamforming to increase the distance by which HARQ feedback may be received, may use multi-panel to increase the angular range by which HARQ feedback may be received, or a combination thereof. However, the receiver may be unaware of the distances or angles at which the transmitter is capable of using beamforming or multi-panel to receive HARQ feedback, and may be unaware of the time-domain locations and frequency-domain locations at which particular beams or antenna panels of the transmitter will be active for receiving HARQ feedback.

SUMMARY

In some aspects, a method of wireless communication, performed by a transmitter, may include transmitting a sidelink communication and sidelink control information (SCI), associated with the sidelink communication, that indicates one or more distance parameter and angle parameter combinations for hybrid automatic repeat request (HARQ) feedback; and receiving HARQ feedback, for the sidelink communication, on a sidelink and from a receiver that satisfies a distance parameter and angle parameter combination of the one or more distance parameter and angle parameter combinations.

In some aspects, a method of wireless communication, performed by a receiver, may include receiving, from a transmitter, a sidelink communication and SCI, associated with the sidelink communication, that indicates one or more distance parameter and angle parameter combinations for HARQ feedback; determining that the receiver satisfies a distance parameter and angle parameter combination of the one or more distance parameter and angle parameter combinations; and transmitting, based at least in part on determining that the receiver satisfies the distance parameter and angle parameter combination, HARQ feedback for the sidelink communication to the transmitter on a sidelink.

In some aspects, a transmitter for wireless communication may include memory and one or more processors operatively coupled to the memory. The memory and the one or more processors may be configured to transmit a sidelink communication and SCI, associated with the sidelink communication, that indicates one or more distance parameter and angle parameter combinations for HARQ feedback; and receive HARQ feedback, for the sidelink communication, on a sidelink and from a receiver that satisfies a distance parameter and angle parameter combination of the one or more distance parameter and angle parameter combinations.

In some aspects, a receiver for wireless communication may include memory and one or more processors operatively coupled to the memory. The memory and the one or more processors may be configured to receive, from a transmitter, a sidelink communication and SCI, associated with the sidelink communication, that indicates one or more distance parameter and angle parameter combinations for HARQ feedback; determine that the receiver satisfies a distance parameter and angle parameter combination of the one or more distance parameter and angle parameter combinations; and transmit, based at least in part on determining that the receiver satisfies the distance parameter and angle parameter combination, HARQ feedback for the sidelink communication to the transmitter on a sidelink.

In some aspects, a non-transitory computer-readable medium may store one or more instructions for wireless communication. The one or more instructions, when executed by one or more processors of a receiver, may cause the one or more processors to: transmit a sidelink communication and SCI, associated with the sidelink communication, that indicates one or more distance parameter and angle parameter combinations for HARQ feedback; and receive HARQ feedback, for the sidelink communication, on a sidelink and from a receiver that satisfies a distance parameter and angle parameter combination of the one or more distance parameter and angle parameter combinations.

In some aspects, a non-transitory computer-readable medium may store one or more instructions for wireless communication. The one or more instructions, when executed by one or more processors of a receiver, may cause the one or more processors to: receive, from a transmitter, a sidelink communication and SCI, associated with the sidelink communication, that indicates one or more distance parameter and angle parameter combinations for HARQ feedback; determine that the receiver satisfies a distance parameter and angle parameter combination of the one or more distance parameter and angle parameter combinations; and transmit, based at least in part on determining that the receiver satisfies the distance parameter and angle parameter combination, HARQ feedback for the sidelink communication to the transmitter on a sidelink.

In some aspects, an apparatus for wireless communication may include means for transmitting a sidelink communication and SCI, associated with the sidelink communication, that indicates one or more distance parameter and angle parameter combinations for HARQ feedback; and means for receiving HARQ feedback, for the sidelink communication, on a sidelink and from a receiver that satisfies a distance parameter and angle parameter combination of the one or more distance parameter and angle parameter combinations.

In some aspects, an apparatus for wireless communication may include means for receiving, from a transmitter, a sidelink communication and SCI, associated with the sidelink communication, that indicates one or more distance parameter and angle parameter combinations for HARQ feedback; means for determining that the apparatus satisfies a distance parameter and angle parameter combination of the one or more distance parameter and angle parameter combinations; and means for transmitting, based at least in part on determining that the apparatus satisfies the distance parameter and angle parameter combination, HARQ feedback for the sidelink communication to the transmitter on a sidelink.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
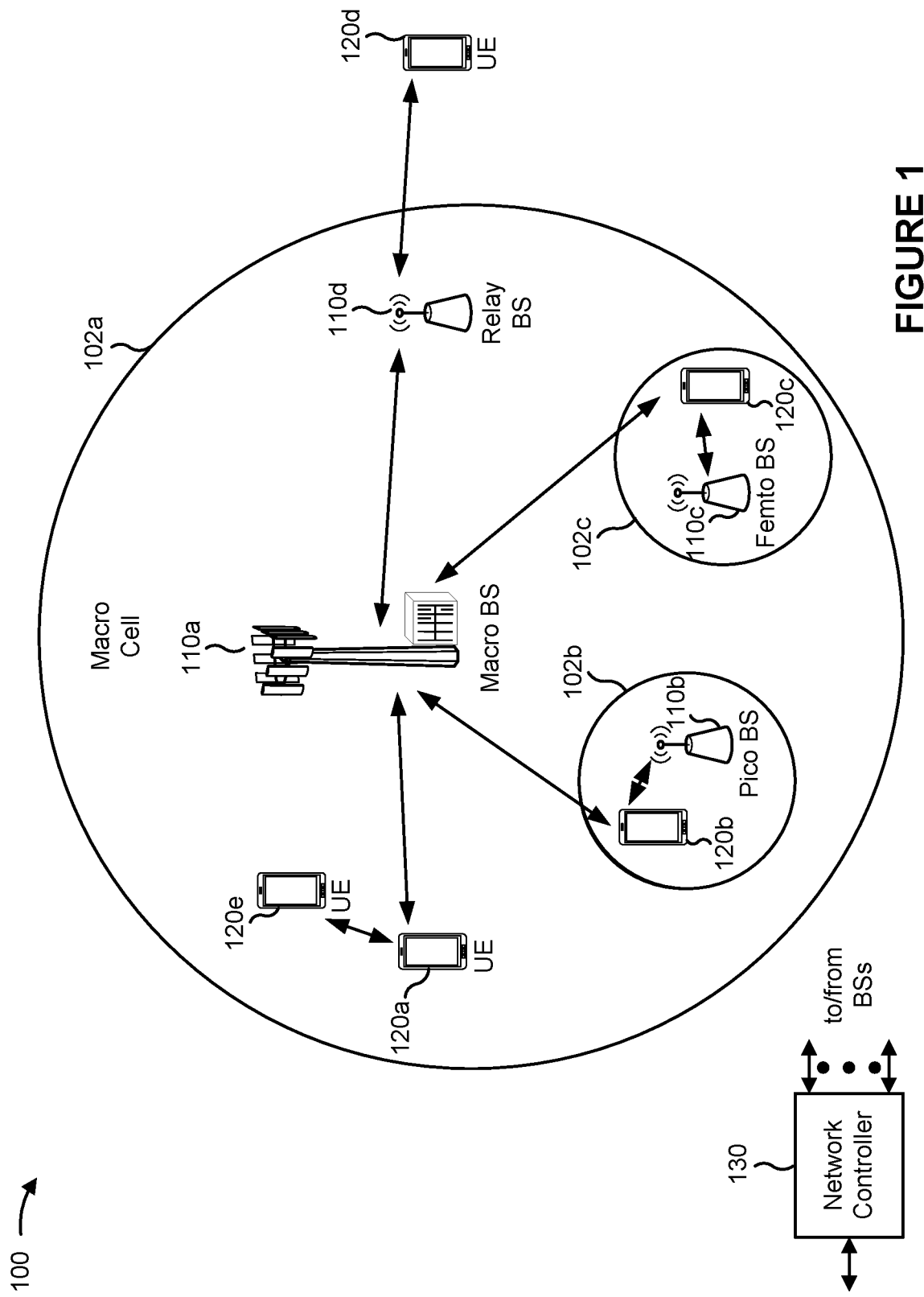
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G or 4G wireless technologies, aspects of the present disclosure can be applied in other generation-based communication systems, such as 5G and later, including NR technologies.

In a wireless network, two or more subordinate entities, such as two or more user equipments (UEs) or two or more integrated access and backhaul (IAB) nodes, may communicate with each other using sidelink communications. Real-world applications of such sidelink communications may include public safety, proximity services, UE-to-network relaying, device-to-device (D2D) communications, vehicle to everything (V2X) communications, vehicle to vehicle (V2V) communications, Internet of Everything (IoE) communications, Internet of things (IoT) communications, mission-critical mesh, or various other suitable applications. A sidelink communication may refer to a communication that is transmitted from one subordinate entity to another subordinate entity (for example, UE-to-UE or IAB node-to-IAB node) without relaying that communication through a scheduling entity (for example, a BS or an IAB donor), even though the scheduling entity may be utilized for scheduling or control purposes. In some examples, a sidelink communication may be transmitted using a licensed frequency spectrum, an unlicensed frequency spectrum (such as an industrial, scientific and medical (ISM) radio band, (for example, 5 GHz), that is reserved for purposes other than cellular communication such as Wi-Fi).

In some cases, a receiver may provide feedback associated with a sidelink communication that was transmitted to the receiver on a sidelink (for example, from transmitter UE to receiver UE or from transmitter IAB node to receiver IAB node). The feedback may include, for example, hybrid automatic repeat request (HARQ) feedback (such as an acknowledgement (ACK) or a negative acknowledgement (NACK) for the sidelink communication). The receiver may transmit the HARQ feedback in one or more HARQ feedback communications on the sidelink.

In some aspects, the transmitter may be capable of using beamforming and a plurality of antenna panels (which, in some cases, may be referred to as multi-panel) to receive HARQ feedback on a sidelink. In this way, the transmitter may use beamforming to increase the distance by which HARQ feedback may be received, may use multi-panel to increase the angular range by which HARQ feedback may be received, or a combination thereof. However, a receiver may be unaware of the distances or angles at which the transmitter is capable of using beamforming or multi-panel to receive HARQ feedback, and may be unaware of the time-domain locations and frequency-domain locations at which particular beams or antenna panels of the transmitter will be active for receiving HARQ feedback.

Some aspects described herein provide techniques and apparatuses for distance and angle based sidelink HARQ. In some aspects, a transmitter may transmit an indication of one or more distance parameter and angle parameter combinations at which the transmitter is capable of using beamforming or multi-panel to receive HARQ feedback for a sidelink communication. Moreover, the transmitter may transmit an indication of the time-domain locations and frequency-domain locations at which particular beams or antenna panels of the transmitter will be active for receiving HARQ feedback.

Particular aspects of the subject matter described in this disclosure can be implemented to realize one or more of the following potential advantages. In some examples, a receiver is enabled to determine that the receiver satisfies a distance parameter and angle parameter combination, and to transmit HARQ feedback in a time-domain location and a frequency-domain location associated with the distance parameter and angle parameter combination. Accordingly, the receiver is enabled to determine the distances or angles at which the transmitter is capable of using beamforming or multi-panel to receive HARQ feedback, and to determine the time-domain locations and frequency-domain locations at which particular beams or antenna panels of the transmitter will be active for receiving HARQ feedback. This permits the transmitter to use beamforming and multi-panel to receive HARQ feedback.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110*a*, BS 110*b*, BS 110*c*, and BS 110*d*) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A network controller 130 may couple to the set of BSs 102*a*, 102*b*, 110*a* and 110*b*, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, or the like, or combinations thereof.

In some aspects, wireless network 100 may include an integrated access and backhaul (IAB) deployment. An IAB deployment may include an IAB donor (which may include a BS 110 that is connected to a wireline backhaul in wireless network 100) and one or more IAB nodes (which may include one or more BSs 110 that are communicatively connected to the IAB donor via a backhaul link, to another IAB node via a backhaul link or sidelink, or a combination thereof). A wireless communication device, such as a UE 120, may communicate with an IAB donor or IAB node via an access link.

UEs 120 (for example, 120*a*, 120*b*, 120*c*) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband interne of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, D2D communications, a V2X protocol (for example, which may include a V2V protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
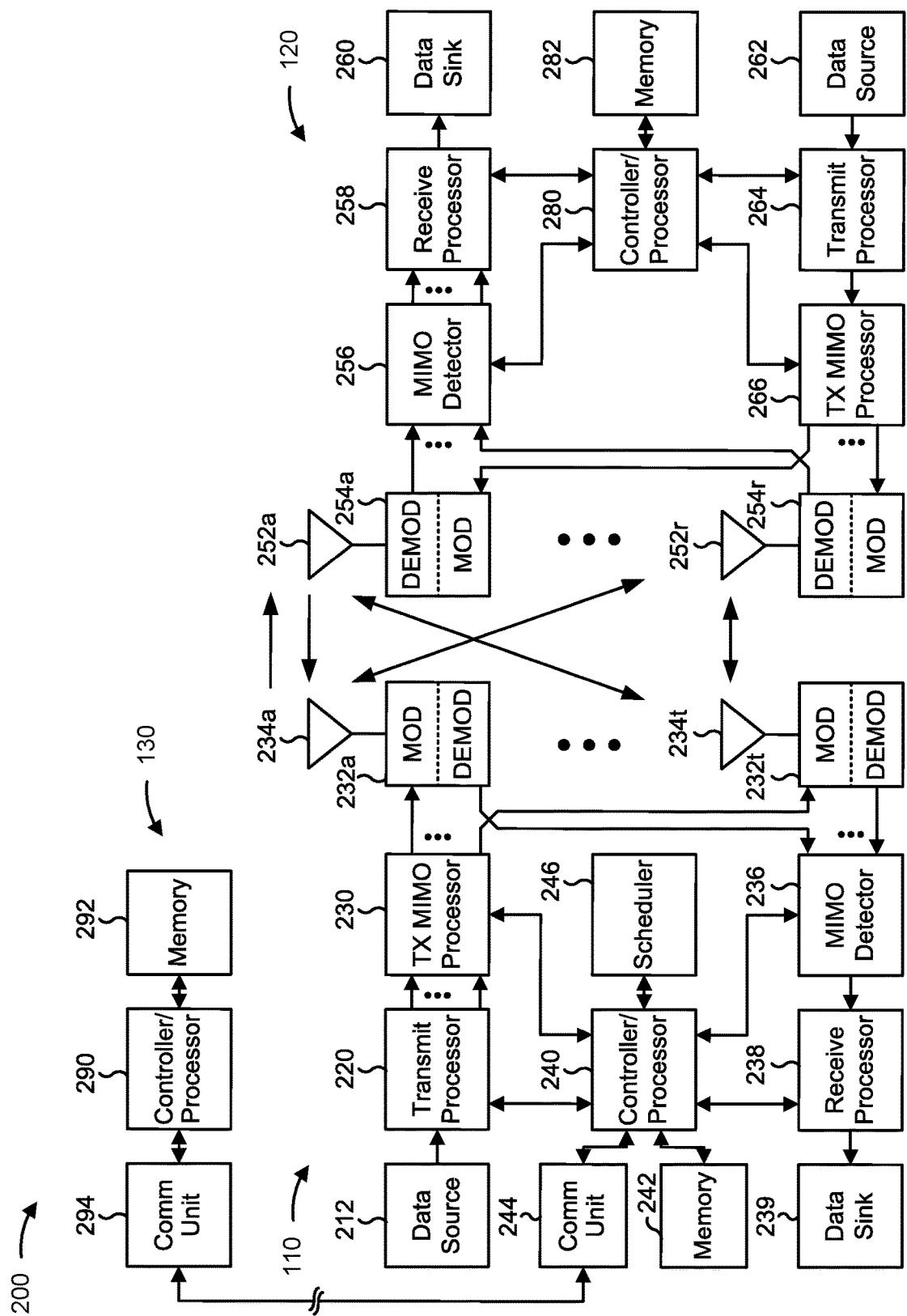
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with distance and angle based sidelink HARQ, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, or other processes as described herein. Memories 242 and 282 may store data and program codes for base station 110 and UE 120, respectively. A scheduler 246 may schedule UEs for data transmission on the downlink or uplink.

In some aspects, a transmitter, such as a BS 110 or a UE 120, may include means for transmitting a sidelink communication and SCI, associated with the sidelink communication, that indicates one or more distance parameter and angle parameter combinations for HARQ feedback; means for receiving HARQ feedback, for the sidelink communication, on a sidelink and from a receiver that satisfies a distance parameter and angle parameter combination of the one or more distance parameter and angle parameter combinations, or the like, or combinations thereof. In some aspects, such means may include one or more components of BS 110 or UE 120 described in connection with FIG. 2.

In some aspects, a receiver, such as a BS 110 or a UE 120 may include means for receiving, from a transmitter, a sidelink communication and SCI, associated with the sidelink communication, that indicates one or more distance parameter and angle parameter combinations for HARQ feedback; means for determining that the receiver satisfies a distance parameter and angle parameter combination of the one or more distance parameter and angle parameter combinations; means for transmitting, based at least in part on determining that the receiver satisfies the distance parameter and angle parameter combination, HARQ feedback for the sidelink communication to the transmitter on a sidelink, or the like, or combinations thereof. In some aspects, such means may include one or more components of BS 110 or UE 120 described in connection with FIG. 2.

Figure 3A:
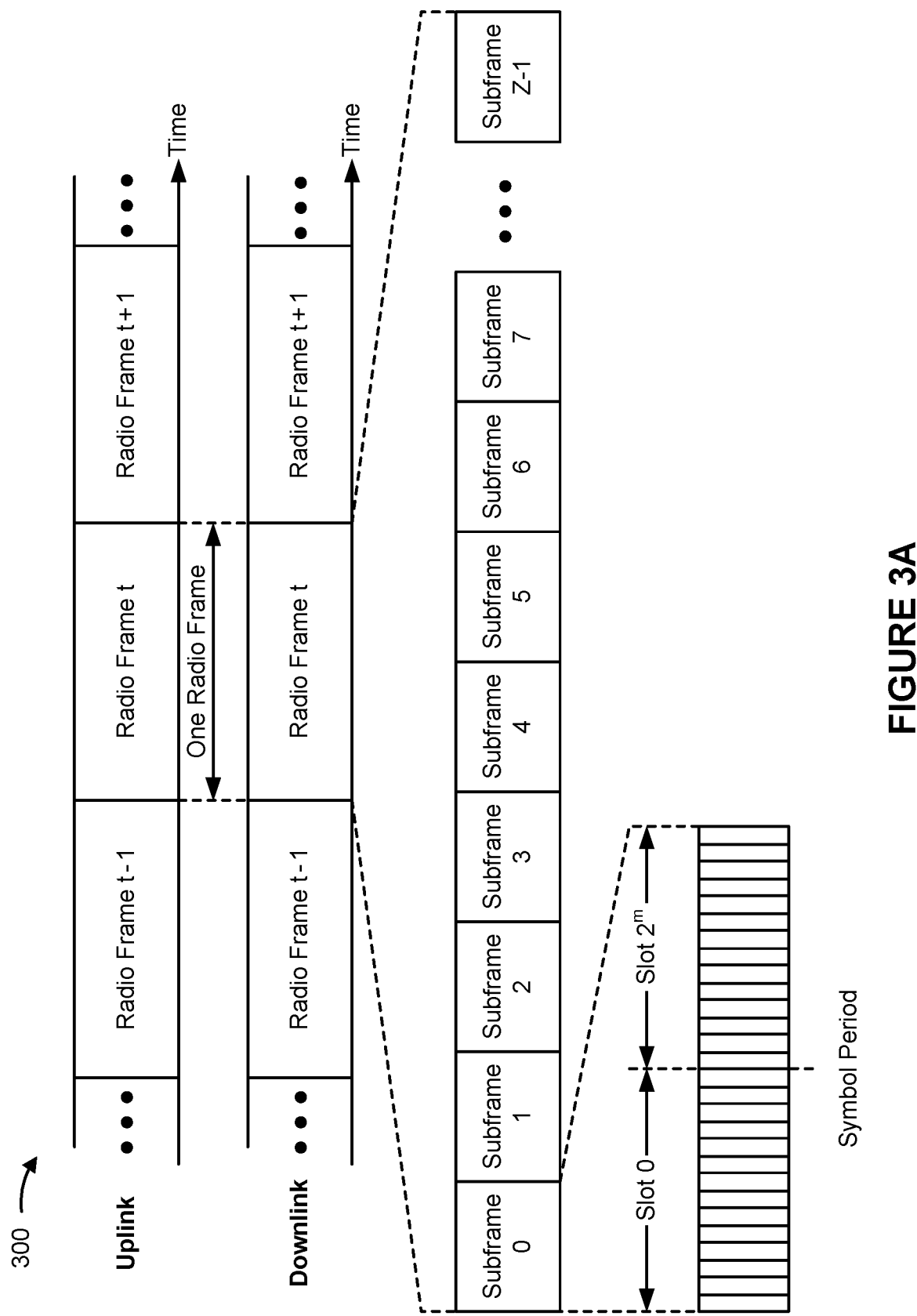
FIG. 3A is a block diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, or the like, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, or the like, or combinations thereof.

While some techniques are described herein in connection with frames, subframes, slots, or the like, or combinations thereof, these techniques may equally apply to other types of wireless communication structures, which may be referred to using terms other than "frame," "subframe," "slot," or the like, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), or the like, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
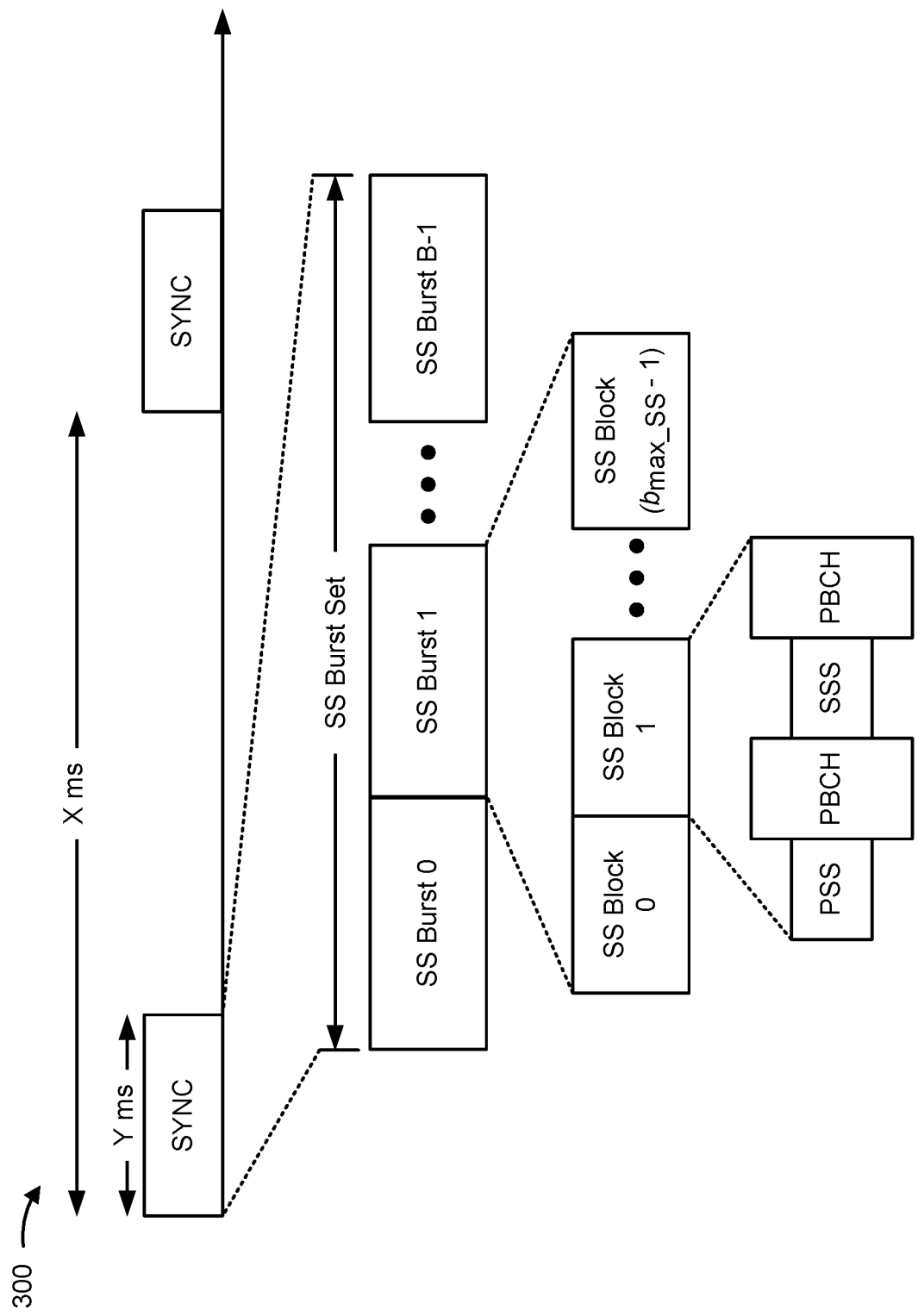
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (identified as SS block 0 through SS block ($b_{max\_SS}$−1), where $b_{max\_SS}$e is a maximum quantity of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBs) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

As indicated above, two or more subordinate entities, such as two or more UEs or two or more IAB nodes, may communicate with each other using sidelink communications. Real-world applications of such sidelink communications may include public safety, proximity services, UE-to-network relaying, D2D communications, V2X communications, V2V communications, IoE communications, IoT communications, mission-critical mesh, or various other suitable applications. A sidelink communication may refer to a communication that is transmitted from one subordinate entity to another subordinate entity (for example, UE-to-UE or IAB node-to-IAB node) without relaying that communication through a scheduling entity (for example, a BS or an IAB donor), even though the scheduling entity may be utilized for scheduling or control purposes. In some examples, a sidelink communication may be transmitted using a licensed frequency spectrum, an unlicensed frequency spectrum (such as an ISM radio band, (for example, 5 GHz), that is reserved for purposes other than cellular communication such as Wi-Fi).

In some cases, a receiver may provide feedback associated with a sidelink communication that a transmitter transmitted to the receiver on a sidelink (for example, from transmitter UE to receiver UE or from transmitter IAB node to receiver IAB node). The feedback may include, for example, HARQ feedback (such as an ACK or a NACK for the sidelink communication). The receiver may transmit the HARQ feedback in one or more HARQ feedback communications on the sidelink.

In some aspects, the transmitter may be capable of using beamforming and a plurality of antenna panels (which, in some cases, may be referred to as multi-panel) to receive HARQ feedback on a sidelink. In this way, the transmitter may use beamforming to increase the distance by which HARQ feedback may be received, may use multi-panel to increase the angular range by which HARQ feedback may be received, or a combination thereof. However, a receiver may be unaware of the distances or angles at which the transmitter is capable of using beamforming or multi-panel to receive HARQ feedback, and may be unaware of the time-domain locations and frequency-domain locations at which particular beams or antenna panels of the transmitter will be active for receiving HARQ feedback.

Some aspects described herein provide techniques and apparatuses for distance and angle based sidelink HARQ. In some aspects, a transmitter may transmit an indication of one or more distance parameter and angle parameter combinations at which the transmitter is capable of using beamforming or multi-panel to receive HARQ feedback for a sidelink communication. Moreover, the transmitter may transmit an indication of the time-domain locations and frequency-domain locations at which particular beams or antenna panels of the transmitter will be active for receiving HARQ feedback. In this way, a receiver may be permitted to determine that the receiver satisfies a distance parameter and angle parameter combination, and may transmit HARQ feedback in a time-domain location and a frequency-domain location associated with the distance parameter and angle parameter combination. Accordingly, the receiver may determine the distances or angles at which the transmitter is capable of using beamforming or multi-panel to receive HARQ feedback, and determine the time-domain locations and frequency-domain locations at which particular beams or antenna panels of the transmitter will be active for receiving HARQ feedback, which permits the transmitter to use beamforming and multi-panel to receive HARQ feedback.

Figure 4:
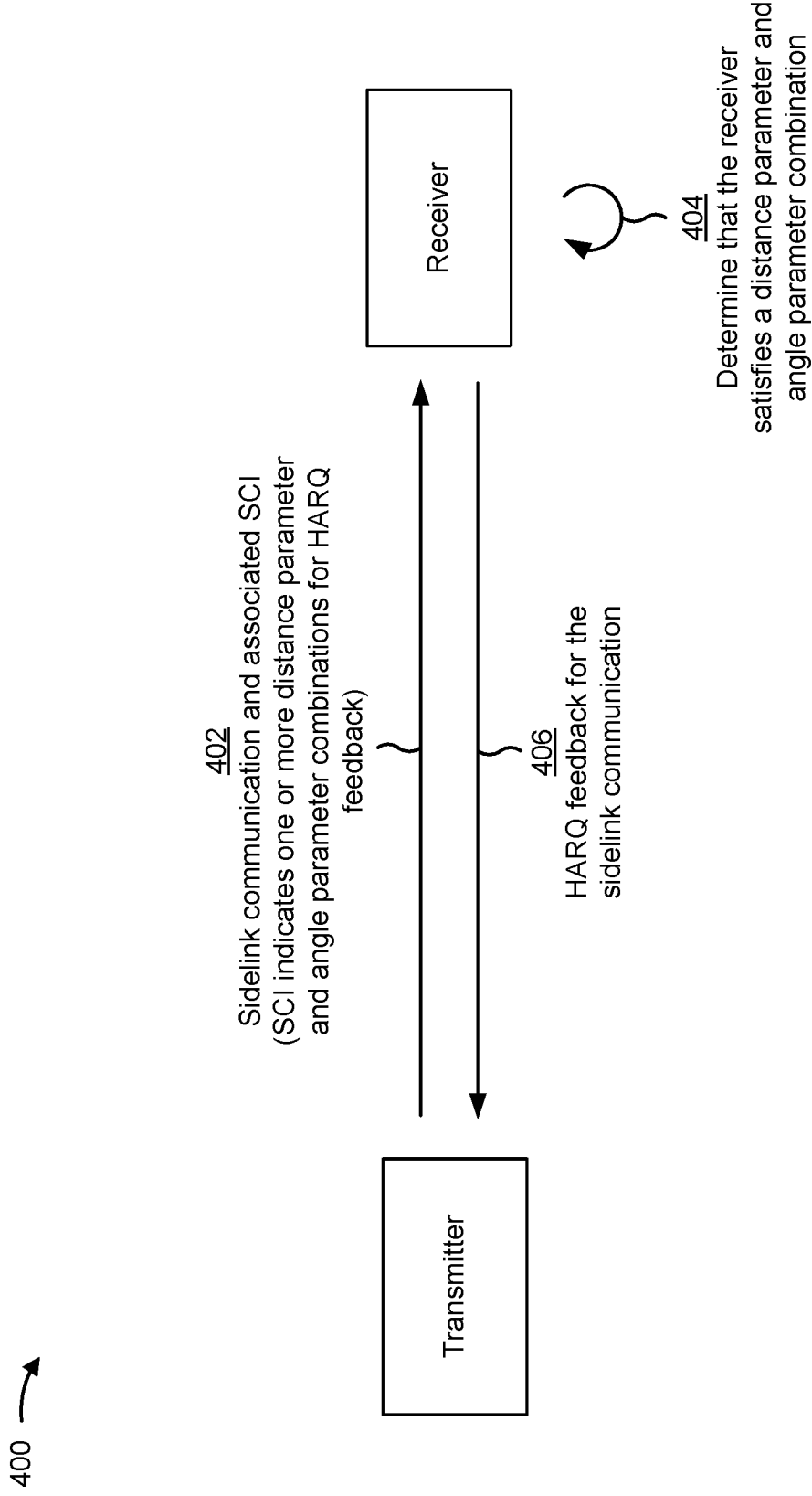
FIGS. 4 and 5 are diagrams illustrating examples of distance and angle based sidelink hybrid automatic repeat request (HARD) in accordance with various aspects of the present disclosure.

FIG. 4 is a diagram 400 illustrating one or more examples of distance and angle based sidelink HARQ in accordance with various aspects of the present disclosure. As shown in FIG. 4, the one or more examples may include a sidelink communication between a transmitter and a receiver. In some aspects, a greater quantity of transmitters, a greater quantity of receivers, or a combination thereof may be included in the one or more examples.

In some aspects, the transmitter and the receiver may include subordinate entities, such as a transmitter UE and a receiver UE or a transmitter IAB node and a receiver IAB node. The transmitter and the receiver may be included in a wireless network, such as wireless network 100, and may communicate via a sidelink. In some aspects, the sidelink may be configured with a frame structure, such as a frame structure 300 of FIG. 3A or another sidelink frame structure.

As shown in FIG. 4, and in a first operation 402, the transmitter may communicate with the receiver via the sidelink by transmitting a sidelink communication to the receiver via the sidelink. In some aspects, the transmitter may transmit the sidelink communication on a physical sidelink shared channel (PSSCH) associated with the sidelink or another type of physical sidelink channel. Moreover, the transmitter may transmit, to the receiver, sidelink control information (SCI) associated with the sidelink communication. In some aspects, the transmitter may transmit the SCI on a physical sidelink control channel (PSCCH) associated with the sidelink or another type of physical sidelink channel. The SCI may include control information associated with the PSSCH and the sidelink communication.

Moreover, the SCI may include HARQ information associated with the sidelink communication. The HARQ information may indicate various parameters for transmitting HARQ feedback for the sidelink communication. In some aspects, the transmitter may be capable of using beamforming and multi-panel to receive HARQ feedback on a sidelink. The transmitter may use beamforming to increase the distance by which HARQ feedback may be received, may use multi-panel to increase the angular range by which HARQ feedback may be received, or a combination thereof. However, a receiver may be unaware of the distances or angles at which the transmitter is capable of using beamforming or multi-panel to receive HARQ feedback, and may be unaware of the time-domain locations and frequency-domain locations at which particular beams or antenna panels of the transmitter will be active for receiving HARQ feedback. Accordingly, the transmitter may indicate, in the HARQ information of the SCI, one or more distance parameter and angle parameter combinations for transmitting HARQ feedback for the sidelink communication. If the receiver determines that the receiver satisfies a distance parameter and angle parameter combination, the receiver may transmit the HARQ feedback in a time-domain resource and a frequency-domain resource associated with the distance parameter and angle parameter combination, which may correspond to a particular beam and antenna panel that is to be activated for receiving HARQ feedback in the time-domain resource and frequency-domain resource.

In some aspects, the transmitter may include the indication of the one or more distance parameter and angle parameter combinations in the SCI associated with the sidelink communication, in addition or alternative to beamforming and multi-panel purposes. For example, the transmitter may be included in a V2V deployment, in which the transmitter, or one or more antenna panels associated with the transmitter, is associated with a vehicle. In this case, each antenna panel may be located in a respective side of the vehicle. Accordingly, the transmitter may specify the distance parameter and angle parameter combinations such that the receiver transmits HARQ feedback to a particular beam and antenna panel combination on a side of the vehicle that the receiver is orientated or facing.

In some aspects, each distance parameter and angle parameter combination indicated in the SCI may include a distance range or distance threshold. If a distance parameter and angle parameter combination includes a distance range, the distance range may be indicated or specified relative to the location of the transmitter. For example, the distance range may include 50-100 meters from the location of the transmitter, 200-400 meters from the location of the transmitter, or another example distance range. In this case, the receiver may determine whether a location of the receiver is within the distance range. If a distance parameter and angle parameter combination includes a distance threshold, the distance range may be indicated or specified relative to the location of the transmitter. For example, the distance range may include 100 meters from the location of the transmitter, 500 meters from the location of the transmitter, or another example distance range. In this case, the receiver may determine whether the location of the of the receiver satisfies the distance threshold.

In some aspects, each distance parameter and angle parameter combination indicated in the SCI associated with the sidelink communication may include one or more angle ranges. The one or more angle ranges may include an azimuth angle range associated with the transmitter (or an antenna or antenna panel associated with the transmitter), an elevation angle range associated with the transmitter (or an antenna or antenna panel associated with the transmitter), among other possibilities/examples. The azimuth angle range may be a horizontal angle range, such as 30°-50° or another example angle range relative to an azimuth angle of the transmitter. In this case, the receiver may determine whether an azimuth angle of the receiver is within the azimuth range. The elevation angle range be a vertical angle range, such as 10°-30° or another example angle range relative to an elevation angle of the transmitter. In this case, the receiver may determine whether an elevation angle of the receiver is within the elevation range.

In some aspects, each distance parameter and angle parameter combination indicated in the SCI associated with the sidelink communication may be associated with a different distance range or distance threshold, a different azimuth angle range, and a different elevation range. In some aspects, two or more distance parameter and angle parameter combinations indicated in the SCI associated with the sidelink communication may be associated with the same different distance range or distance threshold, the same different azimuth angle range, the same different elevation range, or a combination thereof.

In some aspects, the SCI associated with the sidelink communication may include an indication of a time-domain resource and a frequency-domain resource associated with a distance parameter and angle parameter combination indicated in the SCI associated with the sidelink communication. If a receiver satisfies a distance parameter and angle parameter combination indicated in the SCI associated with the sidelink communication, the receiver may use the time-domain resource and the frequency-domain resource associated with the distance parameter and angle parameter combination to transmit HARQ feedback for the sidelink communication.

A time-domain resource may include one or more symbols, one or more slots, one or more subframes, one or more frames, or a combination thereof. A frequency-domain resource may include one or more subcarriers, one or more subchannels, one or more channels, one or more carriers, or a combination thereof. In some aspects, each distance parameter and angle parameter combination indicated in the SCI associated with the sidelink communication may be associated with a different time-domain resource and frequency-domain resource combination. In some aspects, two or more distance parameter and angle parameter combinations indicated in the SCI associated with the sidelink communication may be associated with the same time-domain resource, the same frequency-domain resource, or a combination thereof.

In some aspects, the SCI associated with the sidelink communication may include an indication of a location of the transmitter. The transmitter may determine the location of the transmitter at the time the sidelink communication is transmitted or prior to transmitting the sidelink communication. The transmitter may determine the location of the transmitter by communicating with one or more global navigation satellite system (GNSS) satellites to determine a GNSS estimated location of the transmitter. The location of the transmitter may be indicated in the SCI in GNSS coordinates or another type of location indication.

In some aspects, the SCI associated with the sidelink communication may include an indication of the angle of the transmitter. The indication of the angle of the transmitter may include an azimuth angle of the transmitter and an elevation angle of the transmitter. The azimuth angle may be associated with an antenna panel via which the transmitter may receive HARQ feedback. The transmitter may determine the azimuth angle of the transmitter relative to an absolute direction or location, such as true north (or geodetic north) or the magnetic north pole, may determine the azimuth angle of the transmitter relative to another direction or location, among other possibilities/examples. The transmitter may indicate the azimuth angle in the SCI in degrees or another type of coordinate. The elevation angle may be associated with an antenna panel via which the transmitter may receive HARQ feedback. The transmitter may determine the elevation angle of the transmitter relative to a horizon of the Earth, a horizon relative to the angle of the transmitter, relative to another elevation, among other possibilities/examples. The transmitter may indicate the elevation angle in the SCI in degrees or another type of coordinate.

As further shown in FIG. 4, and in a second operation 404, the receiver may receive the sidelink communication and the associated SCI, and may determine that the receiver satisfies a distance parameter and angle parameter combination of the one or more distance parameter and angle parameter combinations indicated in the SCI. For example, the receiver may determine that the receiver satisfies a distance range or distance threshold associated with the distance parameter and angle parameter combination, and may determine that the receiver satisfies one or more angle ranges associated with the distance parameter and angle parameter combination.

To determine whether the receiver satisfies the distance range or distance threshold, the receiver may determine a location of the receiver, may determine a location of the transmitter, may determine a distance between the location of the receiver and the location of the transmitter, and may determine, based at least in part on the distance between the location of the receiver and the location of the transmitter, whether the location of the receiver is within the distance range from the transmitter or whether the distance between the location of the receiver and the location of the transmitter satisfies the distance threshold.

In some aspects, the receiver may determine the location of the receiver by communicating with one or more GNSS satellites to determine a GNSS estimated location of the receiver. In some aspects, the receiver may determine the location of the receiver by receiving an indication of the location of the receiver from the transmitter, from a BS included in the wireless network, or from a core network component included in the wireless network, among other possibilities/examples.

In some aspects, the receiver may determine the location of the transmitter by identifying an indication of the location of the transmitter in the SCI associated with the sidelink communication. In some aspects, the receiver may determine the location of the transmitter by receiving an indication of the location of the transmitter from a BS included in the wireless network, or from a core network component included in the wireless network, among other possibilities/examples. In some aspects, the receiver may determine the location of the transmitter by performing one or more measurements, such as a round-trip time (RTT) measurement, a signal strength measurement, among other possibilities/examples.

To determine whether the receiver satisfies the one or more angle ranges, the receiver may determine an angle between a line connecting the position of the receiver and the position of the transmitter and the reference direction of the transmitter. The reference direction of the transmitter may be, for example, the direction in which the front of a vehicle associated with the transmitter is facing. Based at least in part on the angle, the receiver can determine whether the receiver is within the one or more angular ranges of the transmitter.

For example, the receiver may determine a position of the receiver (for example, an antenna or antenna panel of the receiver), may determine a position and a reference direction of the transmitter (for example, the antenna or antenna panel of the transmitter), may determine an angle between the line connecting the positions of the receiver and the transmitter and the reference direction of the transmitter, and may determine, based at least in part on the angle, whether the azimuth angle of the receiver is within the azimuth angle range indicated in the SCI. As another example, the receiver may determine a elevation of the receiver (for example, an antenna or antenna panel of the receiver), may determine a elevation and a vertical reference direction of the transmitter (for example, the antenna or antenna panel of the transmitter), may determine an angle between the line connecting the elevations of the receiver and the transmitter and the reference vertical direction of the transmitter, and may determine, based at least in part on the angle, whether the elevation angle of the receiver is within the elevation angle range indicated in the SCI.

In some aspects, the receiver may determine the azimuth angle and the elevation angle of the receiver based at least in part on one or more sensor measurements associated with the receiver, such as a gyroscope measurement, an accelerometer measurement, or another type of angle measurement. In some aspects, the receiver may determine the azimuth angle of the receiver relative to an absolute direction or location, such as true north (or geodetic north) or the magnetic north pole. In some aspects, the receiver may determine the elevation angle of the receiver relative to a horizon of the receiver, relative to a horizon of the Earth at the location of the receiver, relative to a horizon of the transmitter (which may be indicated in the SCI), among other possibilities/examples.

In some aspects, if the receiver determines that the location of the receiver is within the distance range or satisfies the distance threshold associated with a distance parameter and angle parameter combination, determines that the azimuth angle of the receiver is within the azimuth angle range associated with the distance parameter and angle parameter combination, and determines that the elevation angle of the receiver is within the elevation angle range associated with the distance parameter and angle parameter combination, the receiver may determine that the receiver satisfies the distance parameter and angle parameter combination.

As further shown in FIG. 4, and in a third operation 406, the receiver may transmit, on the sidelink, HARQ feedback for the sidelink communication based at least in part on determining that the receiver satisfies a distance parameter and angle parameter combination. The transmitter may receive the HARQ feedback for the sidelink communication on the sidelink from the receiver. The receiver may identify the time-domain location and the frequency-domain location associated with the distance parameter and angle parameter combination, the receiver may transmit the HARQ feedback in the time-domain location and the frequency-domain location, and the transmitter may receive the HARQ feedback in the time-domain location and the frequency-domain location. The receiver may identify the time-domain location and the frequency-domain location associated with the distance parameter and angle parameter combination based at least in part on an indication of the time-domain location and the frequency-domain location in the SCI associated with the sidelink communication.

In some aspects, the receiver may transmit the HARQ feedback on a physical sidelink channel, such as a physical sidelink feedback channel (PSFCH) or another type of physical sidelink channel. The feedback may include an ACK or a NACK for the sidelink communication. The receiver may determine to transmit an ACK for the sidelink communication if the receiver successfully decodes the sidelink communication. If the receiver is unable to successfully decode the sidelink communication, the receiver may determine to transmit a NACK for the sidelink communication.

In some aspects, the receiver may determine that the receiver satisfies a plurality of distance parameter and angle parameter combinations indicated in the SCI. In this case, the receiver may transmit the HARQ feedback in the time-domain location and the frequency-domain location combinations associated with each of the plurality of distance parameter and angle parameter combinations, or may transmit the HARQ feedback in the time-domain location and the frequency-domain location combinations associated with a subset of the plurality of distance parameter and angle parameter combinations. In some aspects, the receiver may determine whether to transmit the HARQ feedback in the time-domain location and the frequency-domain location combinations associated with each of the plurality of distance parameter and angle parameter combinations, or may transmit the HARQ feedback in the time-domain location and the frequency-domain location combinations associated with a subset of the plurality of distance parameter and angle parameter combinations based at least in part on one or more parameters.

The one or more parameters may be indicated in the HARQ information in the SCI, may be indicated in another signaling communication received from the transmitter, a BS, or another component, or may be hardcoded at the receiver (for example, the receiver may be configured with the one or more parameters prior to being deployed in the wireless network), among other possibilities/examples. The one or more parameters may indicate, for example, that the receiver is to transmit the HARQ feedback for the distance parameter and angle parameter combination that includes a distance range closest to the location of the transmitter, that includes the smallest azimuth angle range relative to the azimuth angle of the transmitter, or that includes the smallest elevation angle range relative to the elevation angle of the transmitter.

In this way, the transmitter may transmit, to the receiver, an indication of one or more distance parameter and angle parameter combinations at which the transmitter is capable of using beamforming or multi-panel to receive HARQ feedback for a sidelink communication. Moreover, the transmitter may transmit, to the receiver, an indication of the time-domain locations and frequency-domain locations at which particular beams or antenna panels of the transmitter will be active for receiving HARQ feedback. In this way, the receiver may be permitted to determine that the receiver satisfies a distance parameter and angle parameter combination, and may transmit HARQ feedback in a time-domain location and a frequency-domain location associated with the distance parameter and angle parameter combination. Accordingly, the receiver may determine the distances or angles at which the transmitter is capable of using beamforming or multi-panel to receive HARQ feedback, and determine the time-domain locations and frequency-domain locations at which particular beams or antenna panels of the transmitter will be active for receiving HARQ feedback, which permits the transmitter to use beamforming and multi-panel to receive HARQ feedback.

Figure 5:
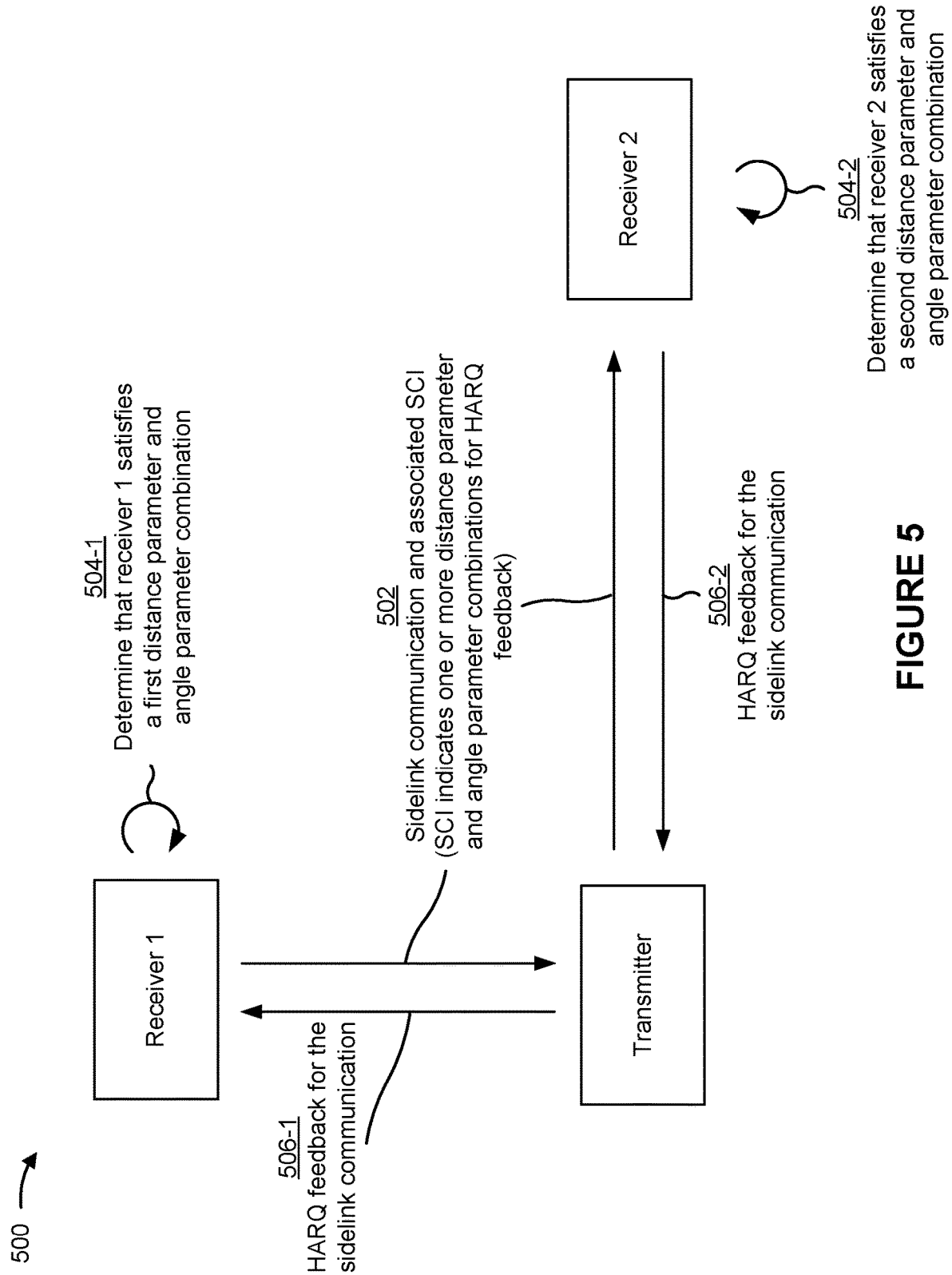

FIG. 5 is a diagram 500 illustrating one or more examples of distance and angle based sidelink HARQ in accordance with various aspects of the present disclosure. As shown in FIG. 5, the one or more examples may include a sidelink communication between a transmitter and a plurality of receivers, such as receiver 1 and receiver 2. In some aspects, a greater quantity of transmitters, a greater quantity of receivers, or a combination thereof may be included in the one or more examples.

In some aspects, the transmitter and the receivers may include subordinate entities, such as a transmitter UE and receiver UEs or a transmitter IAB node and receiver IAB nodes. The transmitter and the receivers may be included in a wireless network, such as wireless network 100, and may communicate via a sidelink. In some aspects, the sidelink may be configured with a frame structure, such as a frame structure 300 of FIG. 3A or another sidelink frame structure.

As shown in FIG. 5, and in a first operation 502, the transmitter may communicate with the receivers via the sidelink by transmitting a sidelink communication to the receivers via the sidelink. In some aspects, the transmitter may transmit the sidelink communication on a PSSCH associated with the sidelink or another type of physical sidelink channel. Moreover, the transmitter may transmit, to the receiver, SCI associated with the sidelink communication. In some aspects, the transmitter may transmit the SCI on a PSCCH associated with the sidelink or another type of physical sidelink channel. In some aspects, the transmitter may transmit the sidelink communication and the SCI to the receivers by broadcasting the sidelink communication and the SCI to the receivers, by multicasting the sidelink communication and the SCI to the receivers, by groupcasting the sidelink communication and the SCI to the receivers, or a combination thereof.

The SCI may include control information associated with the PSSCH and the sidelink communication. Moreover, the SCI may include HARQ information associated with the sidelink communication. The HARQ information may indicate various parameters for transmitting HARQ feedback for the sidelink communication. In some aspects, the transmitter may be capable of using beamforming and multi-panel to receive HARQ feedback on a sidelink. The transmitter may use beamforming to increase the distance by which HARQ feedback may be received, may use multi-panel to increase the angular range by which HARQ feedback may be received, or a combination thereof. However, a receiver may be unaware of the distances or angles at which the transmitter is capable of using beamforming or multi-panel to receive HARQ feedback, and may be unaware of the time-domain locations and frequency-domain locations at which particular beams or antenna panels of the transmitter will be active for receiving HARQ feedback. Accordingly, the transmitter may indicate, in the HARQ information of the SCI, one or more distance parameter and angle parameter combinations for transmitting HARQ feedback for the sidelink communication. If a receiver determines that the receiver satisfies a distance parameter and angle parameter combination, the receiver may transmit the HARQ feedback in a time-domain resource and a frequency-domain resource associated with the distance parameter and angle parameter combination, which may correspond to a particular beam and antenna panel that is to be activated for receiving HARQ feedback in the time-domain resource and frequency-domain resource.

In some aspects, the transmitter may include the indication of the one or more distance parameter and angle parameter combinations in the SCI associated with the sidelink communication, in addition or alternative to beamforming and multi-panel purposes. For example, the transmitter may be included in a V2V deployment, in which the transmitter, or one or more antenna panels associated with the transmitter, is associated with a vehicle. In this case, each antenna panel may be located in a respective side of the vehicle. Accordingly, the transmitter may specify the distance parameter and angle parameter combinations such that a receiver transmits HARQ feedback to a particular beam and antenna panel combination on a side of the vehicle that the receiver is orientated or facing.

In some aspects, each distance parameter and angle parameter combination indicated in the SCI may include a distance range or distance threshold. If a distance parameter and angle parameter combination includes a distance range, the distance range may be indicated or specified relative to the location of the transmitter. For example, the distance range may include 50-100 meters from the location of the transmitter, 200-400 meters from the location of the transmitter, or another example distance range. In this case, a receiver may determine whether a location of the receiver is within the distance range. If a distance parameter and angle parameter combination includes a distance threshold, the distance range may be indicated or specified relative to the location of the transmitter. For example, the distance range may include 100 meters from the location of the transmitter, 500 meters from the location of the transmitter, or another example distance range. In this case, a receiver may determine whether the location of the of the receiver satisfies the distance threshold.

In some aspects, each distance parameter and angle parameter combination indicated in the SCI associated with the sidelink communication may include one or more angle ranges. The one or more angle ranges may include an azimuth angle range associated with the transmitter (or an antenna or antenna panel associated with the transmitter), an elevation angle range associated with the transmitter (or an antenna or antenna panel associated with the transmitter), among other possibilities/examples. The azimuth angle range be a horizontal angle range, such as 30°-50° or another example angle range relative to an azimuth reference direction of the transmitter. In this case, a receiver may determine whether an azimuth angle of the receiver is within the azimuth range. The elevation angle range be a vertical angle range, such as 10°-30° or another example angle range relative to an elevation reference direction of the transmitter. In this case, a receiver may determine whether an elevation angle of the receiver is within the elevation range.

In some aspects, each distance parameter and angle parameter combination indicated in the SCI associated with the sidelink communication may be associated with a different distance range or distance threshold, a different azimuth angle range, and a different elevation range. In some aspects, two or more distance parameter and angle parameter combinations indicated in the SCI associated with the sidelink communication may be associated with the same different distance range or distance threshold, the same different azimuth angle range, the same different elevation range, or a combination thereof.

In some aspects, the SCI associated with the sidelink communication may include an indication of a time-domain resource and a frequency-domain resource associated with a distance parameter and angle parameter combination indicated in the SCI associated with the sidelink communication. If a receiver satisfies a distance parameter and angle parameter combination indicated in the SCI associated with the sidelink communication, the receiver may use the time-domain resource and the frequency-domain resource associated with the distance parameter and angle parameter combination to transmit HARQ feedback for the sidelink communication.

A time-domain resource may include one or more symbols, one or more slots, one or more subframes, one or more frames, or a combination thereof. A frequency-domain resource may include one or more subcarriers, one or more subchannels, one or channels, one or more carriers, or a combination thereof. In some aspects, each distance parameter and angle parameter combination indicated in the SCI associated with the sidelink communication may be associated with a different time-domain resource and frequency-domain resource combination. In some aspects, two or more distance parameter and angle parameter combinations indicated in the SCI associated with the sidelink communication may be associated with the same time-domain resource, the same frequency-domain resource, or a combination thereof.

In some aspects, the SCI associated with the sidelink communication may include an indication of a location of the transmitter. The transmitter may determine the location of the transmitter at the time the sidelink communication is transmitted or prior to transmitting the sidelink communication. The transmitter may determine the location of the transmitter by communicating with one or more global navigation satellite system (GNSS) satellites to determine a GNSS estimated location of the transmitter. The location of the transmitter may be indicated in the SCI in GNSS coordinates or another type of location indication.

In some aspects, the SCI associated with the sidelink communication may include an indication of the reference direction of the transmitter. The indication of the reference direction of the transmitter may include an azimuthal reference direction of the transmitter and an elevational reference direction of the transmitter. The azimuthal reference direction may be associated with an antenna panel via which the transmitter may receive HARQ feedback. The transmitter may determine the azimuthal reference direction of the transmitter relative to an absolute direction or location, such as true north (or geodetic north) or the magnetic north pole, may determine the azimuthal direction angle of the transmitter relative to another direction, among other possibilities/examples. The transmitter may indicate the azimuthal reference angle in the SCI in degrees or another type of coordinate. The elevational reference angle may be associated with an antenna panel via which the transmitter may receive HARQ feedback. The transmitter may determine the elevational reference angle of the transmitter relative to a horizon of the Earth, a horizon relative to the of the transmitter, relative to another elevation, among other possibilities/examples. The transmitter may indicate the elevational reference angle in the SCI in degrees or another type of coordinate.

As further shown in FIG. 4, and in a second operation 504, receiver 1 may receive the sidelink communication and the associated SCI, and may determine that receiver 1 satisfies a distance parameter and angle parameter combination of the one or more distance parameter and angle parameter combinations indicated in the SCI (504-1), and receiver 2 may receive the sidelink communication and the associated SCI, and may determine that receiver 2 satisfies a distance parameter and angle parameter combination of the one or more distance parameter and angle parameter combinations indicated in the SCI (504-2). For example, receiver 1 may determine that receiver 1 satisfies a distance range or distance threshold associated with the distance parameter and angle parameter combination, and may determine that receiver 1 satisfies one or more angle ranges associated with the distance parameter and angle parameter combination. As another example, receiver 2 may determine that receiver 2 satisfies a distance range or distance threshold associated with the distance parameter and angle parameter combination, and may determine that receiver 2 satisfies one or more angle ranges associated with the distance parameter and angle parameter combination.

To determine whether a receiver satisfies the distance range or distance threshold, the receiver may determine a location of the receiver, may determine a location of the transmitter, may determine a distance between the location of the receiver and the location of the transmitter, and may determine, based at least in part on the distance between the location of the receiver and the location of the transmitter, whether the location of the receiver is within the distance range from the transmitter or whether the distance between the location of the receiver and the location of the transmitter satisfies the distance threshold.

In some aspects, a receiver may determine the location of the receiver by communicating with one or more GNSS satellites to determine a GNSS estimated location of the receiver. In some aspects, a receiver may determine the location of the receiver by receiving an indication of the location of the receiver from the transmitter, from a BS included in the wireless network, or from a core network component included in the wireless network, among other possibilities/examples.

In some aspects, a receiver may determine the location of the transmitter by identifying an indication of the location of the transmitter in the SCI associated with the sidelink communication. In some aspects, a receiver may determine the location of the transmitter by receiving an indication of the location of the transmitter from a BS included in the wireless network, or from a core network component included in the wireless network, among other possibilities/examples. In some aspects, a receiver may determine the location of the transmitter by performing one or more measurements, such as an RTT measurement, a signal strength measurement, among other possibilities/examples.

To determine whether a receiver satisfies the one or more angle ranges, the receiver may determine a position of the receiver, may determine a position and a reference direction of the transmitter, may determine an angle between a line connecting the positions of the receiver and the transmitter and a reference direction of the transmitter, and may determine, based at least in part on the angle, whether the angle of the receiver is within the one or more angle ranges from the angle parameters of the transmitter.

For example, a receiver may determine an azimuth angle of the receiver (for example, an antenna or antenna panel of the receiver), may determine an azimuth angle of the transmitter (for example, the antenna or antenna panel of the transmitter), may determine a difference between the azimuth angle of the receiver and the azimuth angle of the transmitter, and may determine, based at least in part on the difference between the azimuth angle of the receiver and the azimuth angle of the transmitter, whether the azimuth angle of the receiver is within the azimuth angle range indicated in the SCI. As another example, a receiver may determine an elevation angle of the receiver (for example, an antenna or antenna panel of the receiver), may determine an elevation angle of the transmitter (for example, the antenna or antenna panel of the transmitter), may determine a difference between the elevation angle of the receiver and the elevation angle of the transmitter, and may determine, based at least in part on the difference between the elevation angle of the receiver and the elevation angle of the transmitter, whether the elevation angle of the receiver is within the elevation angle range indicated in the SCI.

In some aspects, a receiver may determine the relative azimuth angle and the relative elevation angle of the receiver based at least in part on one or more sensor measurements associated with the receiver, such as a GPS. In some aspects, a receiver may determine the relative azimuthal angle of the receiver relative to the transmitter's location. In some aspects, a receiver may determine the relative elevation angle of the receiver relative to the transmitter's elevation location In some aspects, if a receiver determines that the location of the receiver is within the distance range or satisfies the distance threshold indicated associated with a distance parameter and angle parameter combination, determines that the azimuth angle of the receiver is within the azimuth angle range associated with the distance parameter and angle parameter combination, and determines that the elevation angle of the receiver is within the elevation angle range associated with the distance parameter and angle parameter combination, the receiver may determine that the receiver satisfies the distance parameter and angle parameter combination.

As further shown in FIG. 5, and in a third operation 506, receiver 1 may transmit, on the sidelink, HARQ feedback for the sidelink communication based at least in part on determining that receiver 1 satisfies a distance parameter and angle parameter combination (506-1), and receiver 2 may transmit, on the sidelink, HARQ feedback for the sidelink communication based at least in part on determining that receiver 2 satisfies a distance parameter and angle parameter combination (506-2). The transmitter may receive HARQ feedback for the sidelink communication on the sidelink and from each receiver.

Receiver 1 may identify the time-domain location and the frequency-domain location associated with the distance parameter and angle parameter combination that receiver 1 satisfies, and may transmit the HARQ feedback in the time-domain location and the frequency-domain location, and the transmitter may receive the HARQ feedback in the time-domain location and the frequency-domain location. Receiver 1 may identify the time-domain location and the frequency-domain location associated with the distance parameter and angle parameter combination based at least in part on an indication of the time-domain location and the frequency-domain location in the SCI associated with the sidelink communication.

Receiver 2 may identify the time-domain location and the frequency-domain location associated with the distance parameter and angle parameter combination that receiver 2 satisfies, and may transmit the HARQ feedback in the time-domain location and the frequency-domain location, and the transmitter may receive the HARQ feedback in the time-domain location and the frequency-domain location. Receiver 2 may identify the time-domain location and the frequency-domain location associated with the distance parameter and angle parameter combination based at least in part on an indication of the time-domain location and the frequency-domain location in the SCI associated with the sidelink communication.

In some aspects, receiver 1 may determine that receiver 1 satisfies a distance parameter and angle parameter combination, and receiver 2 may determine that receiver 2 satisfies a different distance parameter and angle parameter combination. In this case, receiver 1 may transmit HARQ feedback for the sidelink communication in a time-domain resource and frequency-domain resource combination that is different from a time-domain resource and frequency-domain resource combination in which receiver 2 transmits HARQ feedback for the sidelink communication.

In some aspects, if receiver 1 is located relatively near receiver 2 such that the location of receiver 1 and the location of receiver 2 may be within the same distance range or satisfy the same distance threshold, and if receiver 1 and receiver 2 are orientated similarly such that receiver 1 and receiver 2 satisfy the same one or more angle ranges, then receiver 1 and receiver 2 may both satisfy the same distance parameter and angle parameter combination. In this case, receiver 1 and receiver 2 may both transmit HARQ feedback in the same time-domain resource and frequency-domain resource combination. For example, the HARQ feedback transmitted by receiver 1, and the HARQ feedback transmitted by receiver 2, may be frequency division multiplexed and time division multiplexed in the same time-domain resource and frequency-domain resource combination.

In some aspects, a receiver may transmit the HARQ feedback on a physical sidelink channel, such as a PSFCH or another type of physical sidelink channel. The sidelink may include an ACK or a NACK for the sidelink communication. The receiver may determine to transmit an ACK for the sidelink communication if the receiver successfully decodes the sidelink communication. If a receiver is unable to successfully decode the sidelink communication, the receiver may determine to transmit a NACK for the sidelink communication.

In this way, the transmitter may transmit, to the receivers, an indication of one or more distance parameter and angle parameter combinations at which the transmitter is capable of using beamforming or multi-panel to receive HARQ feedback for a sidelink communication. Moreover, the transmitter may transmit, to the receivers, an indication of the time-domain locations and frequency-domain locations at which particular beams or antenna panels of the transmitter will be active for receiving HARQ feedback. In this way, a receiver may be permitted to determine that the receiver satisfies a distance parameter and angle parameter combination, and may transmit HARQ feedback in a time-domain location and a frequency-domain location associated with the distance parameter and angle parameter combination. Accordingly, a receiver may determine the distances or angles at which the transmitter is capable of using beamforming or multi-panel to receive HARQ feedback, and determine the time-domain locations and frequency-domain locations at which particular beams or antenna panels of the transmitter will be active for receiving HARQ feedback, which permits the transmitter to use beamforming and multi-panel to receive HARQ feedback.

Figure 6:
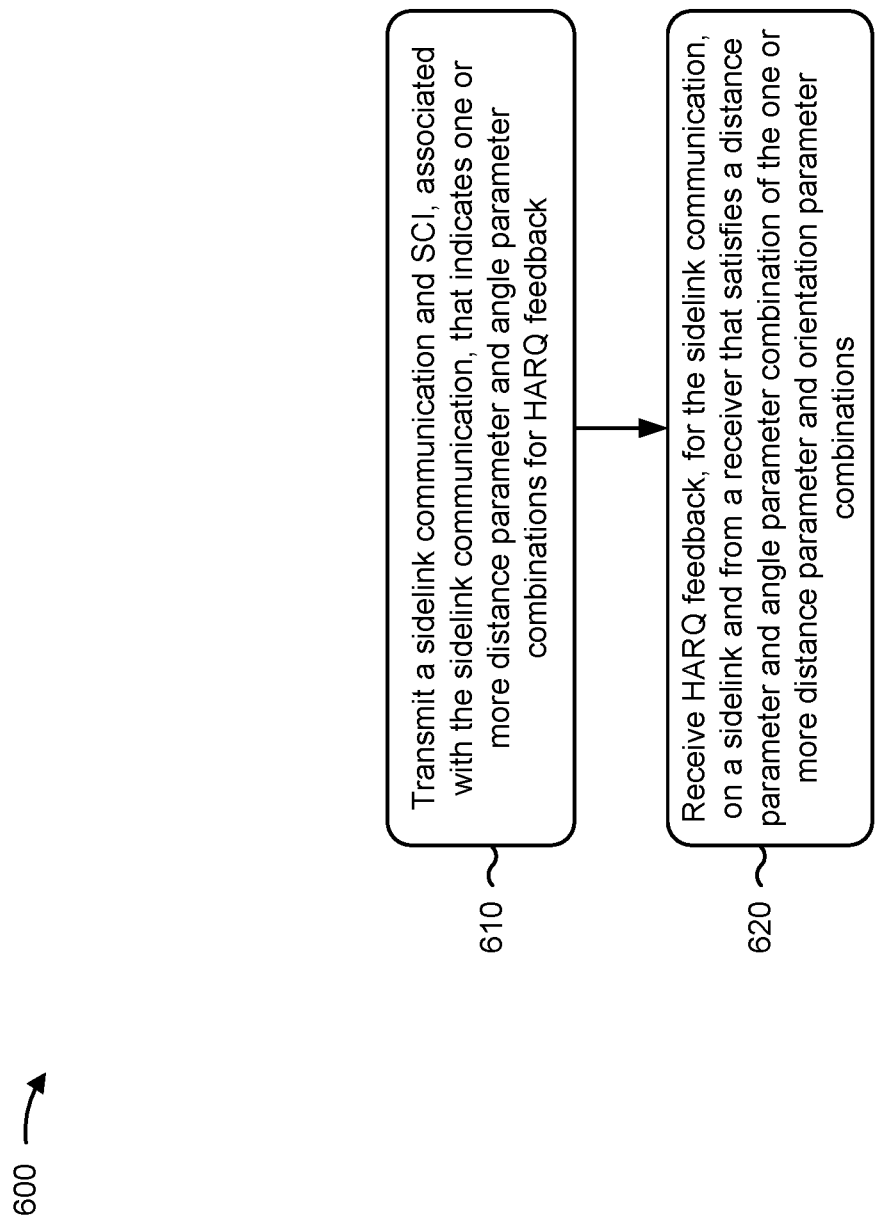
FIG. 6 is a diagram illustrating an example process performed by a transmitter in accordance with various aspects of the present disclosure.

FIG. 6 is a diagram illustrating an example process 600 performed, for example, by a transmitter, in accordance with various aspects of the present disclosure. Example process 600 is an example where a transmitter, such as a BS 110 or a UE 120, performs operations associated with distance and angle based sidelink HARQ.

As shown in FIG. 6, in some aspects, process 600 may include transmitting a sidelink communication and sidelink control information (SCI), associated with the sidelink communication, that indicates one or more distance parameter and angle parameter combinations for HARQ feedback (block 610). For example, the transmitter (for example, using transmit processor 220, receive processor 238, controller/processor 240, memory 242, receive processor 258, transmit processor 264, controller/processor 280, memory 282, among other possibilities/examples) may transmit a sidelink communication and SCI, associated with the sidelink communication, that indicates one or more distance parameter and angle parameter combinations for HARQ feedback, as described above.

As further shown in FIG. 6, in some aspects, process 600 may include receiving HARQ feedback, for the sidelink communication, on a sidelink and from a receiver that satisfies a distance parameter and angle parameter combination of the one or more distance parameter and angle parameter combinations (block 620). For example, the transmitter (for example, using transmit processor 220, receive processor 238, controller/processor 240, memory 242, receive processor 258, transmit processor 264, controller/processor 280, memory 282, among other possibilities/examples) may receive HARQ feedback, for the sidelink communication, on a sidelink and from a receiver that satisfies a distance parameter and angle parameter combination of the one or more distance parameter and angle parameter combinations, as described above.

Process 600 may include additional aspects, such as any single aspect or any combination of aspects described below or in connection with one or more other processes described elsewhere herein.

In a first additional aspect, the transmitter includes a first UE and the receiver includes a second UE. In a second additional aspect, alone or in combination with the first aspect, the transmitter includes a first IAB node and the receiver includes a second IAB node. In a third additional aspect, alone or in combination with one or more of the first and second aspects, the SCI indicates, for the distance parameter and angle parameter combination of the one or more distance parameter and angle parameter combinations, a time-domain resource and a frequency-domain resource in which the receiver is to transmit HARQ feedback, and receiving the HARQ feedback includes receiving the HARQ feedback in the time-domain resource and the frequency-domain resource. In a fourth additional aspect, alone or in combination with one or more of the first through third aspects, each distance parameter and angle parameter combination, of the one or more distance parameter and angle parameter combinations, indicates a distance range relative to the transmitter and one or more angle ranges relative to the transmitter.

In a fifth additional aspect, alone or in combination with one or more of the first through fourth aspects, the one or more angle ranges include at least one of an azimuth angle range or an elevation angle range. In a sixth additional aspect, alone or in combination with one or more of the first through fifth aspects, the SCI indicates, for each distance parameter and angle parameter combination of the one or more distance parameter and angle parameter combinations, a time-domain resource and a frequency-domain resource in which the receiver is to transmit HARQ feedback. In a seventh additional aspect, alone or in combination with one or more of the first through sixth aspects, each distance parameter and angle parameter combination, of the one or more distance parameter and angle parameter combinations, is associated with a beam and antenna panel combination of the transmitter.

In an eighth additional aspect, alone or in combination with one or more of the first through seventh aspects, the distance parameter and angle parameter combination is included in a plurality of distance parameter and angle parameter combinations, of the one or more distance parameter and angle parameter combinations, that the receiver satisfies, and receiving the HARQ feedback includes receiving the HARQ feedback in each time-domain resource and frequency-domain resource associated with the plurality of distance parameter and angle parameter combinations that the receiver satisfies. In a ninth additional aspect, alone or in combination with one or more of the first through eighth aspects, the SCI indicates a location and an angle of the transmitter.

In a tenth additional aspect, alone or in combination with one or more of the first through ninth aspects, process 600 further includes receiving another HARQ feedback, for the sidelink communication, on the sidelink and from another receiver that satisfies another distance parameter and angle parameter combination of the one or more distance parameter and angle parameter combinations. In an eleventh additional aspect, alone or in combination with one or more of the first through tenth aspects, receiving the HARQ feedback includes receiving the HARQ feedback in a time-domain resource and a frequency-domain resource associated with the distance parameter and angle parameter combination, and receiving the other HARQ feedback includes receiving the other HARQ feedback in another time-domain resource and another frequency-domain resource associated with the other distance parameter and angle parameter combination. In a twelfth additional aspect, alone or in combination with one or more of the first through eleventh aspects, the HARQ feedback includes an acknowledgement for the sidelink communication or a negative acknowledgment for the sidelink communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
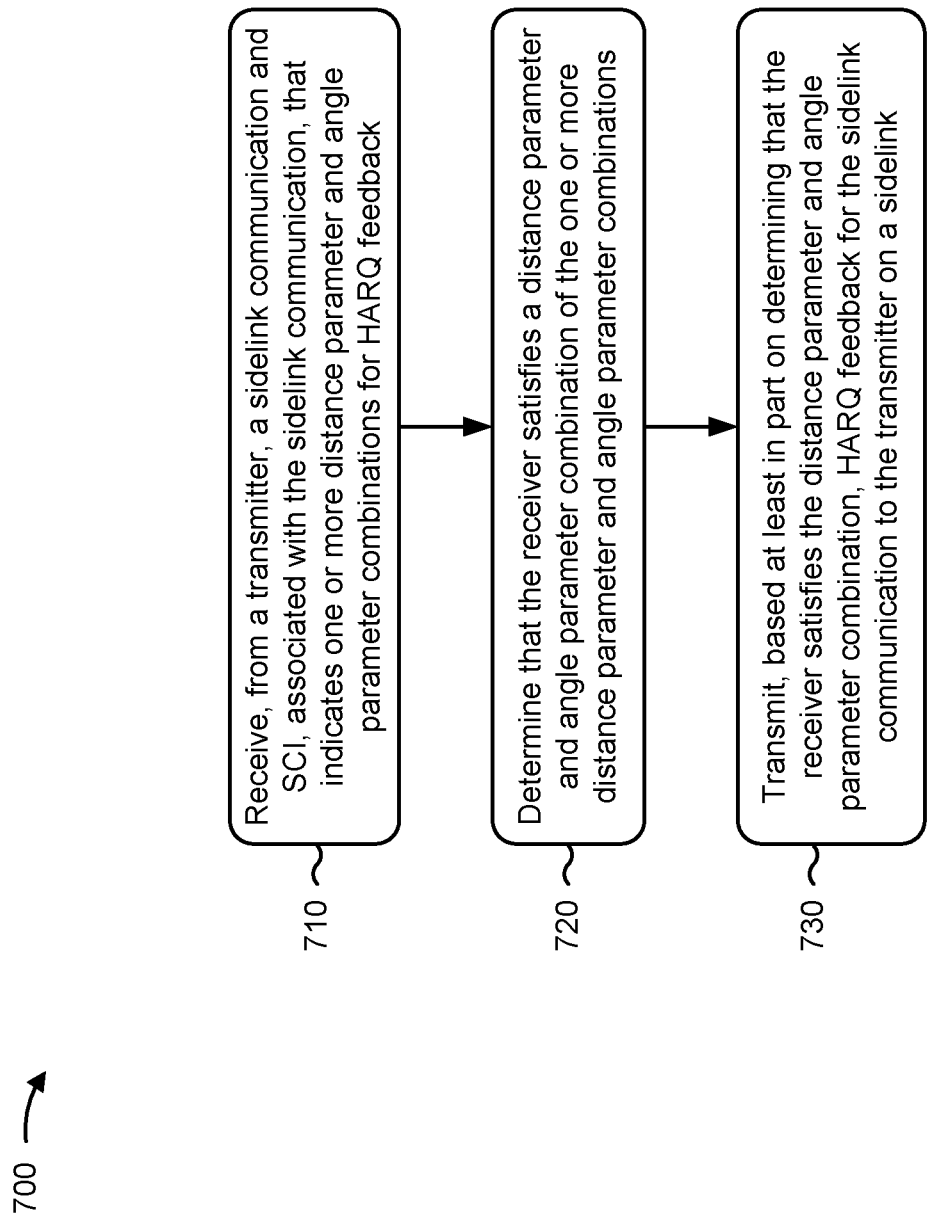
FIG. 7 is a diagram illustrating an example process performed by a receiver in accordance with various aspects of the present disclosure.

FIG. 7 is a diagram illustrating an example process 700 performed, for example, by a receiver, in accordance with various aspects of the present disclosure. Example process 700 is an example where a receiver, such as a BS 110 or a UE 120, performs operations associated with distance and angle based sidelink HARQ.

As shown in FIG. 7, in some aspects, process 700 may include receiving, from a transmitter, a sidelink communication and SCI, associated with the sidelink communication, that indicates one or more distance parameter and angle parameter combinations for HARQ feedback (block 710). For example, the receiver (for example, using transmit processor 220, receive processor 238, controller/processor 240, memory 242, receive processor 258, transmit processor 264, controller/processor 280, memory 282, among other possibilities/examples) may receive, from a transmitter, a sidelink communication and SCI, associated with the sidelink communication, that indicates one or more distance parameter and angle parameter combinations for HARQ feedback, as described above.

As further shown in FIG. 7, in some aspects, process 700 may include determining that the receiver satisfies a distance parameter and angle parameter combination of the one or more distance parameter and angle parameter combinations (block 720). For example, the receiver (for example, using transmit processor 220, receive processor 238, controller/processor 240, memory 242, receive processor 258, transmit processor 264, controller/processor 280, memory 282, among other possibilities/examples) may determine that the receiver satisfies a distance parameter and angle parameter combination of the one or more distance parameter and angle parameter combinations, as described above.

As further shown in FIG. 7, in some aspects, process 700 may include transmitting, based at least in part on determining that the receiver satisfies the distance parameter and angle parameter combination, HARQ feedback for the sidelink communication to the transmitter on a sidelink (block 730). For example, the receiver (for example, using transmit processor 220, receive processor 238, controller/processor 240, memory 242, receive processor 258, transmit processor 264, controller/processor 280, memory 282, among other possibilities/examples) may transmit, based at least in part on determining that the receiver satisfies the distance parameter and angle parameter combination, HARQ feedback for the sidelink communication to the transmitter on a sidelink, as described above.

Process 700 may include additional aspects, such as any single aspect or any combination of aspects described below or in connection with one or more other processes described elsewhere herein.

In a first additional aspect, the transmitter includes a first UE and the receiver includes a second UE. In a second additional aspect, alone or in combination with the first aspect, the transmitter includes a first IAB node and the receiver includes a second IAB node. In a third additional aspect, alone or in combination with one or more of the first and second aspects, the SCI indicates, for the distance parameter and angle parameter combination of the one or more distance parameter and angle parameter combinations, a time-domain resource and a frequency-domain resource in which the receiver is to transmit HARQ feedback, and transmitting the HARQ feedback includes transmitting the HARQ feedback in the time-domain resource and the frequency-domain resource. In a fourth additional aspect, alone or in combination with one or more of the first through third aspects, each distance parameter and angle parameter combination, of the one or more distance parameter and angle parameter combinations, indicates a distance range relative to the transmitter and one or more angle ranges relative to the transmitter.

In a fifth additional aspect, alone or in combination with one or more of the first through fourth aspects, the one or more angle ranges include at least one of an azimuth angle range or an elevation angle range. In a sixth additional aspect, alone or in combination with one or more of the first through fifth aspects, the SCI indicates, for each distance parameter and angle parameter combination of the one or more distance parameter and angle parameter combinations, a time-domain resource and a frequency-domain resource in which the receiver is to transmit HARQ feedback. In a seventh additional aspect, alone or in combination with one or more of the first through sixth aspects, each distance parameter and angle parameter combination, of the one or more distance parameter and angle parameter combinations, is associated with a beam and antenna panel combination of the transmitter.

In an eighth additional aspect, alone or in combination with one or more of the first through seventh aspects, the distance parameter and angle parameter combination indicates a distance range relative to the transmitter and one or more angle ranges relative to the transmitter, and determining that the receiver satisfies the distance parameter and angle parameter combination includes determining that the receiver is located within the distance range and determining that an angle of the receiver is within the angle range. In a ninth additional aspect, alone or in combination with one or more of the first through eighth aspects, determining that the receiver is located within the distance range includes determining a location of the receiver, determining a location of the transmitter, determining a distance between the location of the receiver and the location of the transmitter, and determining, based at least in part on the distance between the location of the receiver and the location of the transmitter, that the receiver is located within the distance range.

In a tenth additional aspect, alone or in combination with one or more of the first through ninth aspects, determining the location of the transmitter includes determining the location of the transmitter based at least in part on an indication of the location of the transmitter in the SCI. In an eleventh additional aspect, alone or in combination with one or more of the first through tenth aspects, determining that the angle of the receiver is within the angle range includes determining the angle of the receiver relative to the transmitter's location, determining a reference direction angle of the transmitter, determining a difference between the relative angle of the receiver and the reference direction angle of the transmitter, and determining, based at least in part on the difference, that the angle of the receiver is within the angle range. In a twelfth additional aspect, alone or in combination with one or more of the first through eleventh aspects, determining the reference direction angle of the transmitter includes determining the reference direction angle of the transmitter based at least in part on an indication of the reference direction angle of the transmitter in the SCI.

In a thirteenth additional aspect, alone or in combination with one or more of the first through twelfth aspects, the angle range includes an azimuthal angle range and an elevation angle range. In a fourteenth additional aspect, alone or in combination with one or more of the first through thirteenth aspects, determining the angle of the receiver includes determining a position of the receiver, a position of the transmitter, and a reference direction of the transmitter, and determining an angle between a line connecting the position of the transmitter, the position of the receiver, and the reference direction of the transmitter, and determining that the angle of the receiver is within the angle range includes determining, based at least in part on the angle between the line connecting the position of the transmitter, the position of the receiver, and the reference direction of the transmitter, that an azimuthal angle of the receiver is within the azimuthal angle range, and determining, based at least in part on the angle between a line connecting an elevational position of the transmitter, an elevational position of the receiver, and a vertical reference, that an elevation angle of the receiver is within the elevation angle range.

In a fifteenth additional aspect, alone or in combination with one or more of the first through fourteenth aspects, the distance parameter and angle parameter combination is included in a plurality of distance parameter and angle parameter combinations, of the one or more distance parameter and angle parameter combinations, that the receiver satisfies, and transmitting the HARQ feedback includes transmitting the HARQ feedback in each time-domain resource and frequency-domain resource associated with the plurality of distance parameter and angle parameter combinations that the receiver satisfies. In a sixteenth additional aspect, alone or in combination with one or more of the first through fifteenth aspects, the distance parameter and angle parameter combination is included in a plurality of distance parameter and angle parameter combinations, of the one or more distance parameter and angle parameter combinations, that the receiver satisfies, and process 700 further includes identifying the distance parameter and angle parameter combination from the plurality of distance parameter and angle parameter combinations that the receiver satisfies. In a seventeenth additional aspect, alone or in combination with one or more of the first through sixteenth aspects, the HARQ feedback includes an acknowledgement for the sidelink communication or a negative acknowledgment for the sidelink communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
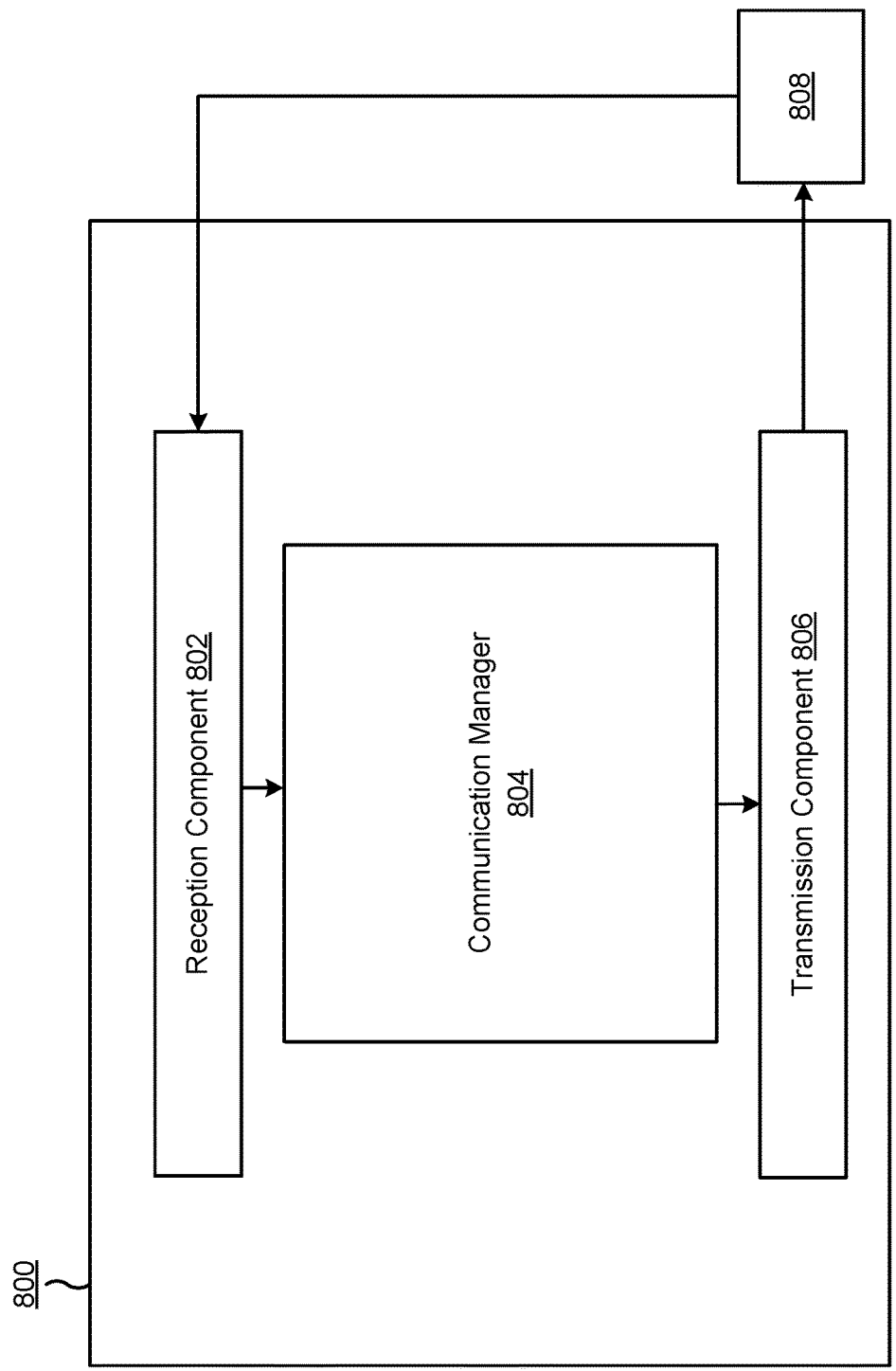
FIGS. 8 and 9 are block diagrams of example apparatuses for wireless communication in accordance with various aspects of the present disclosure.

FIG. 8 is a block diagram of an example apparatus 800 for wireless communication in accordance with various aspects of the present disclosure. The apparatus 800 may be a transmitter (such as a UE, a base station, or another wireless communication device), or a transmitter may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein in connection with FIGS. 4 and 5. Additionally or alternatively, the apparatus 800 may be configured to perform one or more processes described herein, such as process 600 of FIG. 6. In some aspects, the apparatus 800 may include one or more components of the UE or the base station described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the UE or the base station described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the UE or the base station described above in connection with FIG. 2. In some aspects, the transmission component 806 may be collocated with the reception component 802 in a transceiver.

The communication manager 804 may transmit (or may cause the transmission component 806 to transmit), to an apparatus 808, a sidelink communication and SCI associated with the sidelink communication. The SCI may indicate one or more distance parameter and angle parameter combinations for HARQ feedback. The communication manager 804 may receive (or may cause the reception component 802 to receive) HARQ feedback for the sidelink communication on a sidelink. In some aspects, the communication manager 804 may receive (or may cause the reception component 802 to receive) the HARQ feedback from an apparatus 808 that satisfies a distance parameter and angle parameter combination of the one or more distance parameter and angle parameter combinations.

In some aspects, the SCI indicates, for the distance parameter and angle parameter combination of the one or more distance parameter and angle parameter combinations, a time-domain resource and a frequency-domain resource in which the receiver is to transmit HARQ feedback. In these cases, the communication manager 804 may receive (or may cause the reception component 802 to receive) the HARQ feedback in the time-domain resource and the frequency-domain resource. In some aspects, the distance parameter and angle parameter combination is included in a plurality of distance parameter and angle parameter combinations, of the one or more distance parameter and angle parameter combinations, that the apparatus 808 satisfies. In these cases, the communication manager 804 may receive (or may cause the reception component 802 to receive) the HARQ feedback in each time-domain resource and frequency-domain resource associated with the plurality of distance parameter and angle parameter combinations that the apparatus 808 satisfies. In some aspects, the communication manager 804 may include a controller/processor, a memory, a scheduler, a communication unit, or a combination thereof, of the UE or the base station described above in connection with FIG. 2.

In some aspects, the communication manager 804 may include a set of components. Alternatively, the set of components may be separate and distinct from the communication manager 804. In some aspects, one or more components of the set of components may include or may be implemented within a controller/processor, a memory, a scheduler, a communication unit, or a combination thereof, of the UE or the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
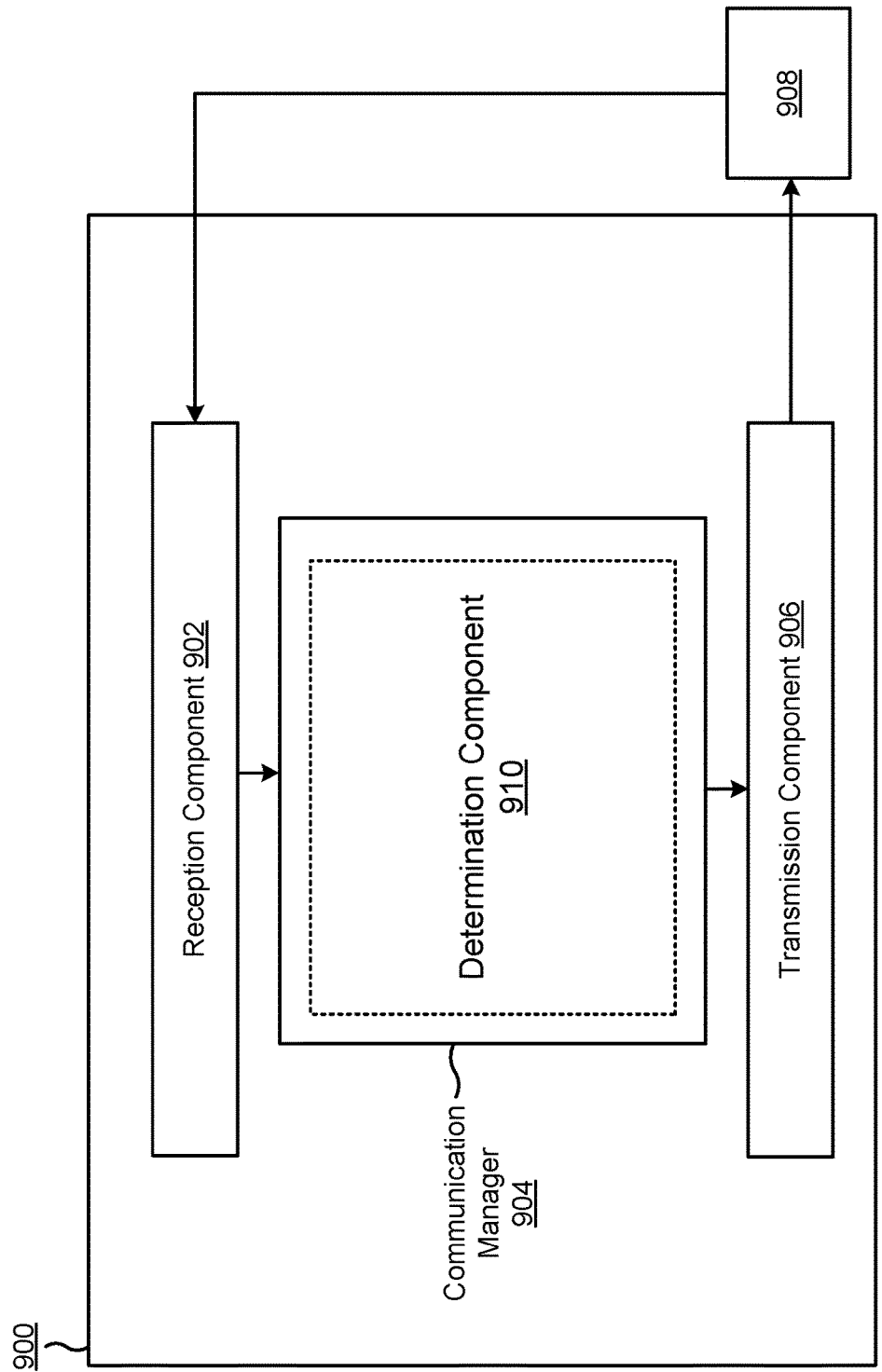

FIG. 9 is a block diagram of an example apparatus 900 for wireless communication in accordance with various aspects of the present disclosure. The apparatus 900 may be a receiver (such as a UE, a base station, or another wireless communication device), or a receiver may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 4 and 5. Additionally or alternatively, the apparatus 900 may be configured to perform one or more processes described herein, such as process 700 of FIG. 7. In some aspects, the apparatus 900 may include one or more components of the UE or the base station described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE or the base station described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE or the base station described above in connection with FIG. 2. In some aspects, the transmission component 906 may be collocated with the reception component 902 in a transceiver.

The communication manager 904 may receive (or may cause the reception component 902 to receive), from an apparatus 908, a sidelink communication and SCI associated with the sidelink communication. The SCI may indicate one or more distance parameter and angle parameter combinations for HARQ feedback. The communication manager 904 may determine that the apparatus 900 satisfies a distance parameter and angle parameter combination of the one or more distance parameter and angle parameter combinations. The communication manager 904 may transmit (or may cause the transmission component 906 to transmit) HARQ feedback for the sidelink communication to the apparatus 908 on a sidelink. In some aspects, the communication manager 904 may transmit (or may cause the transmission component 906 to transmit) the HARQ feedback based at least in part a determination that the apparatus 900 satisfies the distance parameter and angle parameter combination.

In some aspects, the SCI indicates, for the distance parameter and angle parameter combination of the one or more distance parameter and angle parameter combinations, a time-domain resource and a frequency-domain resource in which the apparatus 900 is to transmit HARQ feedback. In these examples, the communication manager 904 may transmit (or may cause the transmission component 906 to transmit) the HARQ feedback in the time-domain resource and the frequency-domain resource. In some aspects, the communication manager 904 may include a controller/processor, a memory, a scheduler, a communication unit, or a combination thereof, of the UE or base station described above in connection with FIG. 2.

In some aspects, the communication manager 904 may include a set of components, such as a determination component 910 as well as other components. Alternatively, the set of components may be separate and distinct from the communication manager 904. In some aspects, one or more components of the set of components may include or may be implemented within a controller/processor, a memory, a scheduler, a communication unit, or a combination thereof, of the UE or the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the determination component 910 may determine that the apparatus 900 satisfies a distance parameter and angle parameter combination of the one or more distance parameter and angle parameter combinations. In some aspects, the distance parameter and angle parameter combination indicates a distance range relative to the apparatus 908 and one or more angle ranges relative to the apparatus 908, and the determination component 910 may determine that the apparatus 900 is located within the distance range and may determine that an angle of the apparatus 900 is within the angle range. The determination component 910 may determine a location of the apparatus 900, may determine a location of the apparatus 908, may determine a distance between the location of the apparatus 900 and the location of the apparatus 908, and may determine, based at least in part on the distance between the location of the apparatus 900 and the location of the apparatus 908, that the apparatus 900 is located within the distance range.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a transmitter, comprising:
    transmitting a sidelink communication and sidelink control information (SCI), associated with the sidelink communication, that indicates one or more distance parameter and angle parameter combinations for hybrid automatic repeat request (HARQ) feedback, wherein the one or more distance parameter and angle parameter combinations include a distance range or distance threshold; and
    receiving the HARQ feedback, for the sidelink communication, on a sidelink and from a receiver that satisfies a distance parameter and angle parameter combination of the one or more distance parameter and angle parameter combinations, wherein the HARQ feedback is received in a time-domain resource and a frequency-domain resource associated with the distance parameter and angle parameter combination.

2. The method of claim 1, wherein the transmitter comprises a first user equipment (UE) and the receiver comprises a second UE, or wherein the transmitter comprises a first integrated access and backhaul (IAB) node and the receiver comprises a second IAB node.

3. The method of claim 1, wherein the SCI indicates, for the distance parameter and angle parameter combination, the time-domain resource and the frequency-domain resource.

4. The method of claim 1, wherein each distance parameter and angle parameter combination, of the one or more distance parameter and angle parameter combinations, indicates the distance range relative to the transmitter and one or more angle ranges relative to the transmitter, and wherein the one or more angle ranges comprise at least one of an azimuth angle range or an elevation angle range.

5. The method of claim 1, wherein the SCI indicates, for each distance parameter and angle parameter combination of the one or more distance parameter and angle parameter combinations, a time-domain resource and a frequency-domain resource in which the receiver is to transmit HARQ feedback.

6. The method of claim 1, wherein each distance parameter and angle parameter combination, of the one or more distance parameter and angle parameter combinations, is associated with a beam and antenna panel combination of the transmitter.

7. The method of claim 1, wherein the distance parameter and angle parameter combination is included in a plurality of distance parameter and angle parameter combinations, of the one or more distance parameter and angle parameter combinations, that the receiver satisfies; and
    wherein receiving the HARQ feedback comprises:
        receiving the HARQ feedback in each time-domain resource and frequency-domain resource associated with the plurality of distance parameter and angle parameter combinations that the receiver satisfies.

8. The method of claim 1, wherein the SCI indicates a location and a reference angle of the transmitter.

9. The method of claim 1, further comprising:
    receiving another HARQ feedback, for the sidelink communication, on the sidelink and from another receiver that satisfies another distance parameter and angle parameter combination of the one or more distance parameter and angle parameter combinations.

10. The method of claim 9, wherein receiving the other HARQ feedback comprises:
    receiving the other HARQ feedback in another time-domain resource and another frequency-domain resource associated with the other distance parameter and angle parameter combination.

11. A method of wireless communication performed by a receiver, comprising:
    receiving, from a transmitter, a sidelink communication and sidelink control information (SCI), associated with the sidelink communication, that indicates one or more distance parameter and angle parameter combinations for hybrid automatic repeat request (HARQ) feedback, wherein the one or more distance parameter and angle parameter combinations include a distance range or distance threshold;
    determining that the receiver satisfies a distance parameter and angle parameter combination of the one or more distance parameter and angle parameter combinations; and
    transmitting, based at least in part on determining that the receiver satisfies the distance parameter and angle parameter combination, the HARQ feedback for the sidelink communication to the transmitter on a sidelink, wherein the HARQ feedback is transmitted in a time-domain resource and a frequency-domain resource associated with the distance parameter and angle parameter combination.

12. The method of claim 11, wherein the transmitter comprises a first user equipment (UE) and the receiver comprises a second UE, or wherein the transmitter comprises a first integrated access and backhaul (IAB) node and the receiver comprises a second IAB node.

13. The method of claim 11, wherein the SCI indicates, for the distance parameter and angle parameter combination, the time-domain resource and the frequency-domain resource.

14. The method of claim 11, wherein each distance parameter and angle parameter combination, of the one or more distance parameter and angle parameter combinations, indicates the distance range relative to the transmitter and one or more angle ranges relative to the transmitter, and wherein the one or more angle ranges comprise at least one of an azimuth angle range or an elevation angle range.

15. The method of claim 11, wherein the SCI indicates, for each distance parameter and angle parameter combination of the one or more distance parameter and angle parameter combinations, a time-domain resource and a frequency-domain resource in which the receiver is to transmit HARQ feedback.

16. The method of claim 11, wherein each distance parameter and angle parameter combination, of the one or more distance parameter and angle parameter combinations, is associated with a beam and antenna panel combination of the transmitter.

17. The method of claim 11, wherein the distance parameter and angle parameter combination indicates the distance range relative to the transmitter and one or more angle ranges relative to the transmitter; and
    wherein determining that the receiver satisfies the distance parameter and angle parameter combination comprises:
        determining that the receiver is located within the distance range and determining that an angle of the receiver is within the one or more angle ranges.

18. The method of claim 17, wherein determining that the receiver is located within the distance range comprises:
    determining a location of the receiver, determining a location of the transmitter, determining a distance between the location of the receiver and the location of the transmitter, and determining, based at least in part on the distance between the location of the receiver and the location of the transmitter, that the receiver is located within the distance range.

19. The method of claim 18, wherein determining the location of the transmitter comprises:
    determining the location of the transmitter based at least in part on an indication of the location of the transmitter in the SCI.

20. The method of claim 17, wherein determining that the angle of the receiver is within the angle range comprises:
    determining the angle of the receiver, determining an angle of the transmitter, determining a difference between the angle of the receiver and the angle of the transmitter, and determining, based at least in part on the difference, that the angle of the receiver is within the angle range.

21. The method of claim 17, wherein determining the angle of the transmitter comprises:
    determining the angle of the transmitter based at least in part on an indication of the angle of the transmitter in the SCI.

22. The method of claim 17, wherein the one or more angle ranges comprises an azimuth angle range and an elevation angle range;
    wherein determining the angle of the receiver comprises:
        determining a position of the receiver, a position of the transmitter, and a reference direction of the transmitter, and
        determining an angle between a line connecting the position of the transmitter, the position of the receiver, and the reference direction of the transmitter; and
    wherein determining that the angle of the receiver is within the one or more angle ranges comprises:
        determining, based at least in part on the angle between the line connecting the position of the transmitter, the position of the receiver, and the reference direction of the transmitter, that an azimuthal angle of the receiver is within the azimuthal angle range, and
        determining, based at least in part on the angle between a line connecting an elevational position of the transmitter, an elevational position of the receiver, and a vertical reference, that an elevation angle of the receiver is within the elevation angle range.

23. The method of claim 11, wherein the distance parameter and angle parameter combination is included in a plurality of distance parameter and angle parameter combinations, of the one or more distance parameter and angle parameter combinations, that the receiver satisfies; and
    wherein transmitting the HARQ feedback comprises:
        transmitting the HARQ feedback in each time-domain resource and frequency-domain resource associated with the plurality of distance parameter and angle parameter combinations that the receiver satisfies.

24. The method of claim 11, wherein the distance parameter and angle parameter combination is included in a plurality of distance parameter and angle parameter combinations, of the one or more distance parameter and angle parameter combinations, that the receiver satisfies; and
    wherein the method further comprises:
        identifying the distance parameter and angle parameter combination from the plurality of distance parameter and angle parameter combinations that the receiver satisfies.

25. A transmitter for wireless communication, comprising:
    a memory; and
    one or more processors coupled to the memory, the one or more processors configured to:
        transmit a sidelink communication and sidelink control information (SCI), associated with the sidelink communication, that indicates one or more distance parameter and angle parameter combinations for hybrid automatic repeat request (HARQ) feedback, wherein the one or more distance parameter and angle parameter combinations include a distance range or distance threshold; and
        receive the HARQ feedback, for the sidelink communication, on a sidelink and from a receiver that satisfies a distance parameter and angle parameter combination of the one or more distance parameter and angle parameter combinations, wherein the HARQ feedback is received in a time-domain resource and a frequency-domain resource associated with the distance parameter and angle parameter combination.

26. The transmitter of claim 25, wherein the SCI indicates, for the distance parameter and angle parameter combination, the time-domain resource and the frequency-domain resource.

27. The transmitter of claim 25, wherein the distance parameter and angle parameter combination is included in a plurality of distance parameter and angle parameter combinations, of the one or more distance parameter and angle parameter combinations, that the receiver satisfies; and wherein the one or more processors, when receiving the HARQ feedback, are configured to:

receive the HARQ feedback in each time-domain resource and frequency-domain resource associated with the plurality of distance parameter and angle parameter combinations that the receiver satisfies.

28. A receiver for wireless communication, comprising:

a memory; and one or more processors coupled to the memory, the one or more processors configured to:

receive, from a transmitter, a sidelink communication and sidelink control information (SCI), associated with the sidelink communication, that indicates one or more distance parameter and angle parameter combinations for hybrid automatic repeat request (HARQ) feedback, wherein the one or more distance parameter and angle parameter combinations include a distance range or distance threshold;

determine that the receiver satisfies a distance parameter and angle parameter combination of the one or more distance parameter and angle parameter combinations; and transmit, based at least in part on determining that the receiver satisfies the distance parameter and angle parameter combination, the HARQ feedback for the sidelink communication to the transmitter on a sidelink, wherein the HARQ feedback is transmitted in a time-domain resource and a frequency-domain resource associated with the distance parameter and angle parameter combination.

29. The receiver of claim 28, wherein the distance parameter and angle parameter combination indicates the distance range relative to the transmitter and one or more angle ranges relative to the transmitter; and wherein the one or more processors, when determining that the receiver satisfies the distance parameter and angle parameter combination, are configured to:

determine that the receiver is located within the distance range and determine that an angle of the receiver is within the one or more angle ranges.

30. The receiver of claim 29, wherein the one or more processors, when determining that the receiver is located within the distance range, are configured to:

determine a location of the receiver, determine a location of the transmitter, determine a distance between the location of the receiver and the location of the transmitter, and determine, based at least in part on the distance between the location of the receiver and the location of the transmitter, that the receiver is located within the distance range.

* * * * *